United States Patent
Galitsky

(10) Patent No.: US 11,847,420 B2
(45) Date of Patent: Dec. 19, 2023

(54) CONVERSATIONAL EXPLAINABILITY

(71) Applicant: Oracle International Corporation, Redwood Shores, CA (US)

(72) Inventor: Boris Galitsky, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 340 days.

(21) Appl. No.: 16/930,226

(22) Filed: Jul. 15, 2020

(65) Prior Publication Data

US 2021/0279424 A1    Sep. 9, 2021

Related U.S. Application Data

(60) Provisional application No. 62/985,666, filed on Mar. 5, 2020.

(51) Int. Cl.
| | | |
|---|---|---|
| *G06F 40/35* | (2020.01) | |
| *H04L 51/02* | (2022.01) | |
| *G06F 40/295* | (2020.01) | |
| *G06F 16/248* | (2019.01) | |
| *G06F 16/242* | (2019.01) | |

(Continued)

(52) U.S. Cl.
CPC .......... *G06F 40/35* (2020.01); *G06F 16/2379* (2019.01); *G06F 16/242* (2019.01); *G06F 16/248* (2019.01); *G06F 40/295* (2020.01); *G06N 20/00* (2019.01); *H04L 51/02* (2013.01)

(58) Field of Classification Search
CPC .... G06F 40/35; G06F 40/295; G06F 16/2379; G06F 16/242; G06F 16/248
See application file for complete search history.

(56) References Cited

U.S. PATENT DOCUMENTS

| | | |
|---|---|---|
| 6,961,692 B1 | 11/2005 | Polanyi et al. |
| 7,013,259 B1 | 3/2006 | Polanyi et al. |
| | (Continued) | |

OTHER PUBLICATIONS

Wang et al., "A Reinforcement Learning Framework for Explainable Recommendation", 2018 IEEE International Conference on Data Mining. (Year: 2018).*

(Continued)

*Primary Examiner* — Anne L Thomas-Homescu
(74) *Attorney, Agent, or Firm* — Kilpatrick Townsend & Stockton LLP

(57) ABSTRACT

Systems, devices, and methods discussed herein provide improved autonomous agent applications that are configured to provide explanations in response to user-submitted questions. A user query may be received and a classification (e.g., a general question, a specific question) for the user query may be determined based at least in part on a predefined rule set (or a classification model). A set of decision features (e.g., particular user data) associated with a decision generated by a machine-learning model may be identified. An explanation chain may be identified from a plurality of explanation chains based at least in part on the user query. The explanation chain may describe a logical chain of explanations associated with a decision making process related to the machine-learning model. A response to the user query may be provided based at least in part on the explanation chain and the set of decision features.

20 Claims, 14 Drawing Sheets

(51) Int. Cl.
    G06F 16/23       (2019.01)
    G06N 20/00       (2019.01)

(56)          References Cited

U.S. PATENT DOCUMENTS 10,114,816 B1*  10/2018  Srivastava .............. G06F 40/35
    10,248,721 B2*   4/2019  Pitsos .................... G06F 16/36
    10,733,654 B2*   8/2020  Jadhav ................... G06F 16/95
    10,951,560 B1*   3/2021  Jain ..................... G06F 16/9024
    11,057,322 B1*   7/2021  Jain ...................... H04L 51/046
    11,132,993 B1*   9/2021  McDaniel ............ G06F 40/284
  2002/0046018 A1    4/2002  Marcu et al.
  2003/0138758 A1    7/2003  Burstein et al.
  2004/0044519 A1    3/2004  Polanyi et al.
  2004/0158452 A1    8/2004  Polanyi et al.
  2004/0158453 A1    8/2004  Polanyi et al.
  2007/0143098 A1    6/2007  Van Den Berg et al.
  2010/0332475 A1*  12/2010  Birdwell ........... G06F 16/24578
                                                        707/E17.014
  2013/0110498 A1*   5/2013  Bekkerman ........... G06Q 50/01
                                                              704/9
  2015/0081277 A1    3/2015  Behi
  2017/0358295 A1   12/2017  Roux et al.
  2018/0052818 A1    2/2018  Bethard et al.
  2018/0174220 A1*   6/2018  Jadhav ................... G06F 16/95
  2018/0218731 A1*   8/2018  Gustafson ............... G10L 15/22
  2018/0293241 A1*  10/2018  Chittar ................... G06N 20/20
  2018/0329880 A1   11/2018  Galitsky
  2018/0357221 A1   12/2018  Galitsky
  2018/0365228 A1   12/2018  Galitsky
  2019/0005027 A1    1/2019  He et al.
  2019/0005089 A1*   1/2019  Kempf ................ G06F 16/2425
  2019/0095420 A1    3/2019  Galitsky
  2019/0205390 A1*   7/2019  Fang ....................... G06F 40/30
  2019/0304157 A1*  10/2019  Amer ...................... G06V 20/41
  2019/0325069 A1*  10/2019  Santos ................ G06F 16/9538
  2019/0354805 A1*  11/2019  Hind ....................... G06N 20/10
  2019/0371299 A1   12/2019  Jiang et al.
  2020/0065220 A1*   2/2020  Sobran ................ G06F 11/3664
  2020/0073938 A1*   3/2020  Losalka .................. G06F 40/35
  2020/0334568 A1*  10/2020  Liden ....................... G06N 5/04
  2021/0006576 A1*   1/2021  Juliato ................ H04L 63/1441
  2021/0019635 A1*   1/2021  Wolf ....................... G06F 17/16
  2021/0049503 A1*   2/2021  Nourian .................. G06N 7/023
  2021/0287260 A1*   9/2021  Cheah ................. G06F 16/3329

OTHER PUBLICATIONS

Arya et al., "One Explanation Does Not Fit All: A Toolkit and Taxonomy of AI Explainability Techniques," ArXiv abs/1909.03012, Sep. 14, 2019, 18 pages.
Bowman et al., "A Large Annotated Corpus for Learning Natural Language Inference," ArXiv preprint arXiv:1508.05326, Aug. 21, 2015, 11 pages.
Camburu et al., "e-snli: Natural Language Inference with Natural Language Explanations," Advances in Neural Information Processing Systems, 2018, 11 pages.
Galitsky et al., "Learning Adversarial Reasoning Patterns in Customer Complaints," Workshop at AAAI, (WS-11-06) 2011, 8 pages.
Galitsky et al., "Chatbot with a Discourse Structure-Driven Dialogue Management," Proceedings of the EACL 2017 Software Demonstrations, Valencia, Spain, c 2017 Association for Computational Linguistics , Apr. 3-7, 2017, pp. 87-90.
Galitsky et al., "Customers' Retention Requires an Explainability Feature in Machine Learning Systems They Use," 2018 AAAI Spring Symposium Series, pp. 214-220.
Polleti et al., "Explanations within Conversational Recommendation Systems: Improving Coverage through Knowledge Graph Embeddings," Association for the Advancement of Artificial Intelligence (www.aaai.org), 2020, 8 pages.
Zhu et al., "Explainable AI for Designers: A Human-Centered Perspective on Mixed-Initiative Co-Creation," 2018 IEEE Conference on Computational Intelligence and Games (CIG) 8 pages.
Jansen et al., "Worldtree: A Corpus of Explanation Graphs for Elementary Science Questions Supporting Multi-Hop Inference," CoRR, abs/1802.03052, 2018, 9 pages.
Ling et al., "Program Induction by Rationale Generation: Learning to Solve and Explain Algebraic Word Problems." CoRR, abs/1705.04146, Oct. 23, 2017.
Molnar, "Interpretable Machine Learning. A Guide for Making Black Box Models Explainable," Published on Aug. 14, 2018, 185 pages.
Park et al., Multimodal Explanations: Justifying Decisions and Pointing to the Evidence. CoRR, abs/1802.08129, Feb. 15, 2018, 11 pages.
Ribeiro et al., "Why should I trust you?: Explaining the predictions of any classifier," CoRR, abs/1602.04938, Aug. 9, 2016, 10 pages.
Ouyang et al., "Improving Recommendation by Deep Latent Factor-Based Explanation," Associated for the Advancement of Artificial Intelligence, 2020, 9 pages.
Došilovic et al., "Explainable artificial intelligence: A survey," In Proc. MIPRO, 2018, pp. 210-215.
Galitsky et al., "Inductive learning of dispute scenarios for online resolution of customer complaints," 3rd International IEEE Conference Intelligent Systems, 2006, pp. 103-108.
Galitsky et al., "Assessing plausibility of explanation and meta-explanation in inter-human conflicts," Engineering Applications of Artificial Intelligence 24 (8), 2011, pp. 1472-1486.
Galitsky, "Explainable Machine Learning for Chatbots," In Developing Enterprise Chatbots, Springer, Cham, Switzerland, 2019, pp. 53-83.
Galitsky, "Chatbot Components and Architectures," In Developing Enterprise Chatbots, Springer, Cham, Switzerland 2019, 13-47.
Better Language Models and their Implications, OpenAI, Available Online at: https://openai.com/blog/better-language-models/, Feb. 14, 2019, 11 pages.
Bernardy et al., What Kind of Natural Language Inference are NLP Systems Learning: Is this Enough? Proceedings of the 11th International Conference on Agents and Artificial Intelligence (ICAART), Feb. 2019, pp. 919-931.
Branavan et al., Reading between the Lines: Learning to Map High-Level Instructions to Commands, Proceedings of the 48th Annual Meeting of the Association for Computational Linguistics, Jul. 2010, pp. 1268-1277.
Chandu et al., Reading Between the Lines: Exploring Infilling in Visual Narratives, Proceedings of the Conference on Empirical Methods in Natural Language Processing (EMNLP), Nov. 2020, pp. 1220-1229.
Clark et al., Think you have Solved Question Answering? Try ARC, the AI2 Reasoning Challenge, arXiv:1803.05457, Available Online at: https://arxiv.org/pdf/1803.05457.pdf, 2018, 10 pages.
Cooper et al., Using the Framework, Framework for Computational Semantics LRE 62-051, Jan. 1996, 170 pages.
Demszky et al., Transforming Question Answering Datasets into Natural Language Inference Datasets, arXiv:1809.02922, Available Online at: https://arxiv.org/pdf/1809.02922.pdf, 2018, 11 pages.
Elmessiry et al., Triaging Patient Complaints: Monte Carlo Cross-Validation of Six Machine Learning Classifiers, JMIR Medical Informatics, vol. 5, No. 3, Jul. 31, 2017, 10 pages.
Falke et al., Ranking Generated Summaries by Correctness: An Interesting but Challenging Application for Natural Language Inference, In Proceedings of the 57th Annual Meeting of the Association for Computational Linguistics, Jul. 2019, pp. 2214-2220.
Fan et al., Strategies for Structuring Story Generation, Proceedings of the 57th Annual Meeting of the Association for Computational Linguistics, Jul. 28-Aug. 2, 2019, pp. 2650-2660.
Galitsky, Discourse Level Dialogue Management, Developing Enterprise Chatbots, Apr. 5, 2019, pp. 365-426.
Galitsky, Reasoning and Simulation of Mental Attitudes of a Customer, Artificial Intelligence for Customer Relationship Management: Solving Customer Problems, 2021, pp. 371-428.
Galitsky, Truth, Lie and Hypocrisy, Artificial Intelligence for Customer Relationship Management: Solving Customer Problems, 2021, pp. 223-287.

(56) References Cited

OTHER PUBLICATIONS

Geiger et al., Stress-testing Neural Models of Natural Language Inference with Multiply-quantified Sentences, arXiv:1810.13033, Available Online at: https://arxiv.org/pdf/1810.13033.pdf, 2018, 6 pages.

Glockner et al., Breaking NLI Systems with Sentences that Require Simple Lexical Inferences, arXiv:1805.02266, Available Online at: https://arxiv.org/pdf/1805.02266.pdf, 2018, pp. 650-655.

Hwang et al., Comet-Atomic 2020: On Symbolic and Neural Commonsense Knowledge Graphs, arXiv:2010.05953, Available Online at: https://arxiv.org/pdf/2010.05953.pdf, 2021, 19 pages.

Ilvovsky et al., Controlling Chat Bot Multi-Document Navigation with the Extended Discourse Trees, 4th International Conference on Computational Linguistics in Bulgaria (CLIB), Jun. 2020, pp. 63-71.

Kapanipathi et al., Infusing Knowledge into the Textual Entailment Task using Graph Convolutional Networks, Proceedings of the AAAI Conference on Artificial Intelligence, vol., No. 3405, Apr. 2020, pp. 8074-8081.

Kaplan, Read Between the Lines: Understanding Clinical Studies, Winter, vol. 18, No. 1, Feb. 16, 2019, 13 pages.

Lai et al., Learning to Predict Denotational Probabilities for Modeling Entailment, Proceedings of the 15th Conference of the European Chapter of the Association for Computational Linguistics: vol. 1, Long Papers, Apr. 2017, pp. 721-730.

Lamprell et al., Reading Between the Lines: A Five-Point Narrative Approach to Online Accounts of Illness, Journal of Medical Humanities, vol. 40, No. 4, Dec. 2019, pp. 569-590.

Lenat, Cyc: A Large-Scale Investment in Knowledge Infrastructure, Communications of the ACM, vol. 38, No. 11, Nov. 1995, pp. 33-38.

Makhalova et al., FCA-Based Approach for Query Refinement in IR-Chatbots, 18th Russian Conference, RCAI, Oct. 10-16, 2020, 13 pages.

Michael, Learning from Partial Observations, International Joint Conference on Artificial Intelligence (IJCAI), 2007, 7 pages.

Mitchell, Reading the Web: A Breakthrough Goal for AI, AI Magazine, 2005, 1 page.

Naik et al., Stress Test Evaluation for Natural Language Inference, In Proceedings of the 27th International Conference on Computational Linguistics, 2018, pp. 2340-2353.

Pearl, On the Interpretation of do(x), UCLA Cognitive Systems Laboratory, Technical Report R-486, Feb. 2019, pp. 1-9.

Radford et al., Language Models are Unsupervised Multitask Learners, Available Online at: https://d4mucfpksywv.cloudfront.net/better-language-models/language_models_are_unsupervised_multitask_learners.pdf, Mar. 2019, 24 pages.

Richardson et al., Probing Natural Language Inference Models through Semantic Fragments, Proceedings of the AAAI Conference on Artificial Intelligence, 2019, pp. 8713-8721.

Saha et al., ConjNLI: Natural Language Inference Over Conjunctive Sentences, arXiv:2010.10418, Available Online at: https://arxiv.org/pdf/2010.10418.pdf, 2020, 14 pages.

Salvatore et al., A Logical-based Corpus for Cross-lingual Evaluation, arXiv:1905.05704, Available Online at: https://arxiv.org/pdf/1905.05704.pdf, May 10, 2019, 9 pages.

Shalyminov et al., Challenging Neural Dialogue Models with Natural Data: Memory Networks Fail on Incremental Phenomena, arXiv:1709.07840, Available Online at: https://arxiv.org/pdf/1709.07840.pdf, 2017, 9 pages.

Trivedi et al., Repurposing Entailment for Multi-Hop Question Answering Tasks, In Proceedings of the North American Chapter of the Association for Computational Linguistics: Human Language Technologies, 2019, pp. 2948-2958.

Valiant, A Theory of the Learnable, Communications of the ACM, vol. 27, No. 11, Nov. 1984, pp. 1134-1142.

Valiant, Knowledge Infusion, AAAI, Available Online at: https://people.seas.harvard.edu/~valiant/AAAI06.pdf, 2006, pp. 1546-1551.

Vendrov et al., Order-embeddings of Images and Language, In Proceedings of the International Conference of Learning Representations (ICLR), 2016, 12 pages.

Vu et al., Grounded Textual Entailment, arXiv:1806.05645, Available Online at: https://arxiv.org/pdf/1806.05645.pdf, 2018, 15 pages.

Warstadt et al., BLiMP: The Benchmark of Linguistic Minimal Pairs for English, Transactions of the Association for Computational Linguistics, vol. 8, Jul. 1, 2020, pp. 377-392.

Williams et al., A Broad-coverage Challenge Corpus for Sentence Understanding through Inference, In Proceedings of the Conference of the North American Chapter of the Association for Computational Linguistics: Human Language Technologies, vol. 1 (Long Papers), Jun. 1-6, 2018, pp. 1112-1122.

Zhou et al., Evaluating Commonsense in Pre-Trained Language Models, arXiv:1911.11931, Available Online at: https://arxiv.org/pdf/1911.11931.pdf, 2019, 8 pages.

U.S. Appl. No. 16/408,224, Notice of Allowance dated Jan. 7, 2022, 9 pages.

U.S. Appl. No. 16/408,224, Supplemental Notice of Allowability dated Feb. 15, 2022, 4 pages.

U.S. Appl. No. 16/902,015, First Action Interview Office Action Summary dated Mar. 11, 2022, 5 pages.

U.S. Appl. No. 16/902,015, First Action Interview Pilot Program Pre-Interview Communication dated Jan. 21, 2022, 5 pages.

U.S. Appl. No. 16/995,302, Notice of Allowance dated Jan. 7, 2022, 11 pages.

Galitsky, Discovering Rhetorical Agreement between a Request and Response, Dialogue & Discourse, vol. 8, No. 2, Dec. 1, 2017, pp. 167-205.

Galitsky et al., On a Chat Bot Finding Answers with Optimal Rhetoric Representation, Proceedings of Recent Advances in Natural Language Processing, Nov. 10, 2017, pp. 253-259.

Galitsky et al., Rhetoric Map of an Answer to Compound Queries, Proceedings of the 53rd Annual Meeting of the 20 Association for Computational Linguistics and the 7th International Joint Conference of Natural Language Processing, vol. 2, Jul. 26-31, 2015, pp. 681-686.

Galitsky, et al., Matching sets of parse trees for answering multi-sentence questions, In Proceedings of the International Conference Recent Advances in Natural Language Processing RANLP 2013, pp. 285-293, Hissar, Bulgaria. INCOMA Ltd. Shoumen, Bulgaria.

Indian Application No. 202047007045, First Examination Report dated Mar. 25, 2022, 6 pages.

Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.

Maziero, et al., Revisiting Cross-document Structure Theory for multi-document discourse parsing, Information Processing and Management: an International Journal, vol. 50, Issue 2, Mar. 2014 pp. 297-314, https://doi.org/10.1016/j.ipm.2013.12.003.

Sadek et al., A Discourse-Based Approach for Arabic Question Answering, ACM Transactions on Asian and Low-Resource Language Information Processing, vol. 16, No. 2, Article 11, Nov. 4, 2016, pp. 1-18.

Sadek et al., Arabic Rhetorical Relations Extraction for Answering "Why" and "How to" Questions, NLDB'12: Proceedings of the 17th international Conference on Applications of Natural Language Processing and Information Systems, Jun. 26, 2012, pp. 385-390.

Verberne et al., Discourse-Based Answering of Why-Questions, TAL Traitement Automatique des Langues, vol. 47, No. 2, Sep. 2007, pp. 21-41.

\* cited by examiner

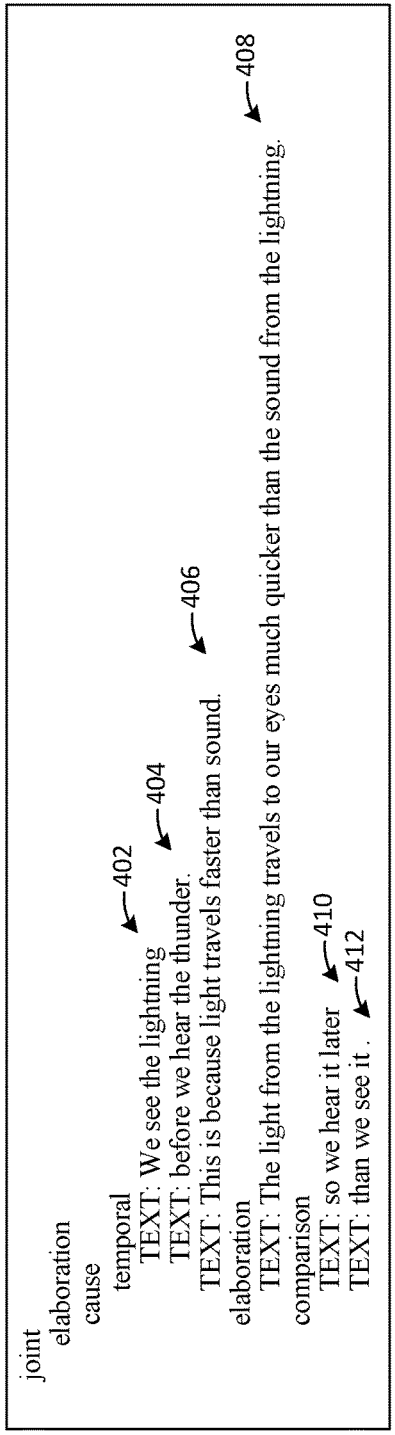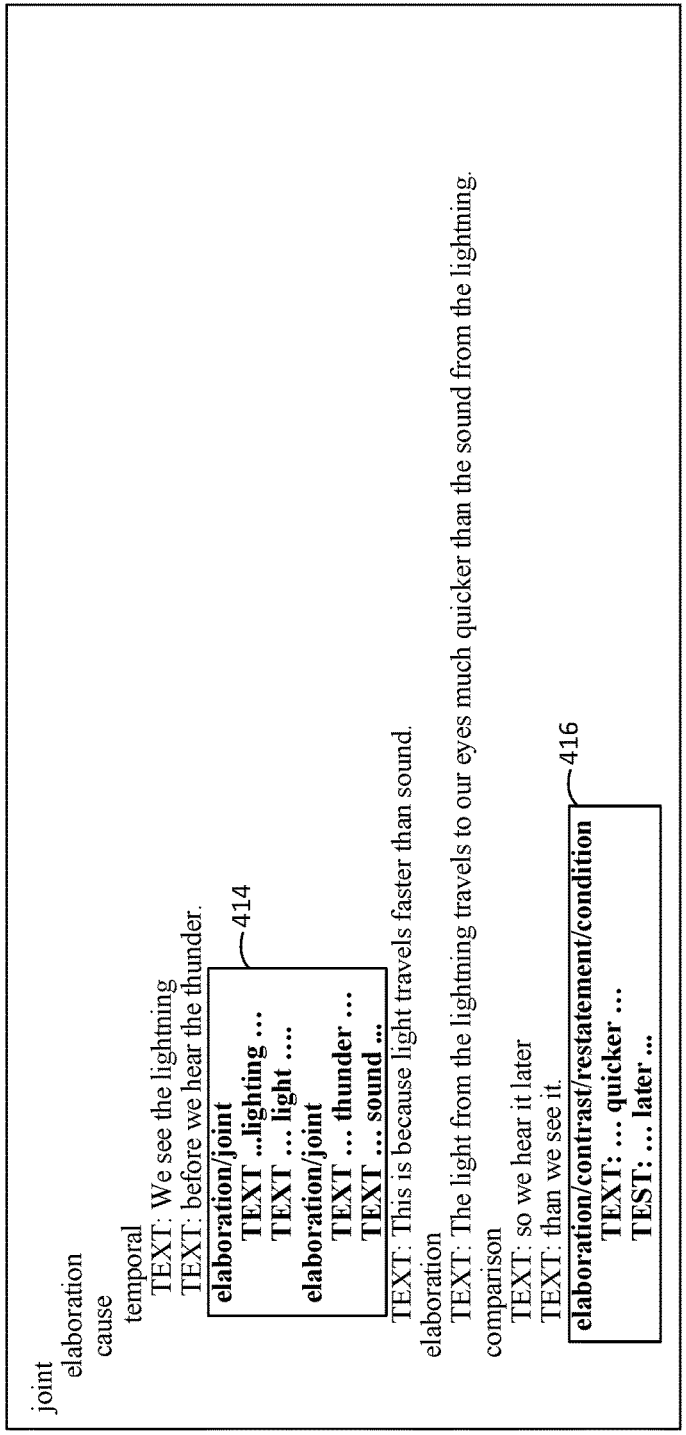
FIG. 4A
FIG. 4B

CONVERSATIONAL EXPLAINABILITY

CROSS-REFERENCE TO RELATED APPLICATIONS

This non-provisional application claims priority to U.S. Patent Application No. 62/985,666, filed on Mar. 5, 2020, the disclosure of which is herein incorporated by reference in its entirety for all purposes.

TECHNICAL FIELD

This disclosure is generally concerned with linguistics. More specifically, this disclosure relates to using providing answers that include explanations to user submitted questions.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

BRIEF DESCRIPTION OF THE DRAWINGS

FIG. 4A depicts an example discourse tree from which an explanation chain may be generated, in accordance with at least one embodiment.

FIG. 4B depicts an example complete discourse tree corresponding to the discourse tree of FIG. 4A, in accordance with at least one embodiment.

DETAILED DESCRIPTION

Figure 1:
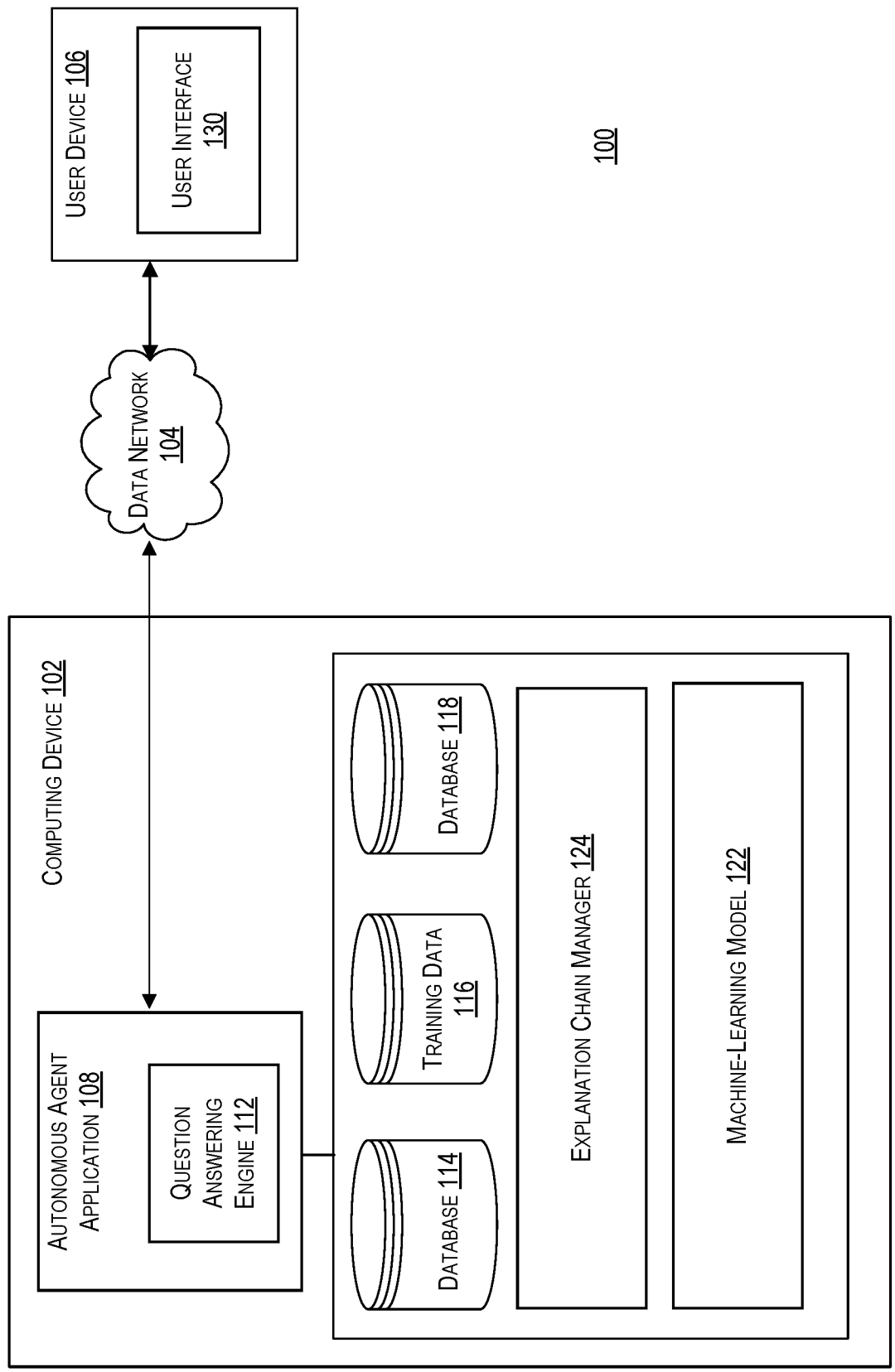
FIG. 1 depicts an autonomous agent environment, in accordance with at least one embodiment.

Aspects of the present disclosure relate to providing conversational explanations. Machine learning has great potential for improving products, processes and research. But computers usually do not explain their predictions which can be a barrier to the adoption of machine learning. Despite widespread adoption, machine learning (ML) models remain mostly black boxes. Understanding the reasons behind predictions may be important in assessing trust, if one plans to take action based on a prediction, or when choosing whether to deploy a new model. Such understanding also provides insights into the model, which can be used to transform an untrustworthy model or prediction into a trustworthy one. Whether humans are directly using machine learning classifiers as tools, or are deploying models within other products, a vital concern remains: if the users do not trust a model or a prediction, they will not use it.

It is important to distinguish two different ML-components of trust: 1) trusting a prediction, i.e. whether a user trusts an individual prediction sufficiently to take some action based on it; and 2) trusting a model, i.e. whether the user trusts a model to behave in reasonable ways if deployed. Both are directly impacted by how much the human understands a model's behavior, as opposed to seeing it as a black box.

In some embodiments, an explanation of a decision of an abstract ML system may be provided in the form of a conversation, to improve the user's trust in that this decision is fair and reasonable, even if this decision does not favor a goal of this user. One value of a conversational explanation versus a static explanation in the form of a report is that it can provide as much or as little of the available details as the user desires, without overloading a user with details outside of her interest. Another value of conversation instead of single-step search is a user capability of drilling in and/or drilling out of factors determined to be essential when the decision was made. Therefore, an explanation in a conversational form can be an efficient way to increase users' trust of both particular decision and ML model.

In some embodiments, a conversational interface may be utilized for a decision log of an abstract ML system that enumerates the decision steps and features employed to arrive to a given decision. Conversational content may augment the decision log with background knowledge to better handle questions and provide complete answers. As a result, the users who can chat with the decision making system may develop a substantially higher trust in it than they would with a black-box ML or conventional report-based explanation. Conversational explainability (CE) (e.g., a term for utilizing providing explanations in the conversational interfaces discussed herein) may allow the user(s) to get into as many details as they wish concerning the decision process. Conversational explanation may be considered a special form of dialogue management that follows an explanation chain (discussed in more detail below). The proposed CE system delivers meaningful explanation in 65% cases, whereas a conventional, report-based explanations—in 49% of cases (for the same decision sessions).

If a ML model performs well, why do not we just trust the model and ignore why it made a certain decision? One problem is that a single metric, such as classification accuracy, is an incomplete description of most real-world ML tasks. Therefore beyond supporting a trust by a user, explainability can be a measure of an ML system's own performance irrespectively of its interpretation by an observer.

The conversational interface discussed herein may utilize free-form natural language (NL) explanations, instead of providing explanations in a formal language. The utilization of NL explanations may provide a number of benefits. For example, NL is readily comprehensible to an end-user who needs to assert a model's reliability. NL may be the easiest for humans to provide free-form language, which may eliminate the additional effort of learning to produce formal language, thus making it simpler to collect such datasets. NL justifications might eventually be mined from existing large-scale free-form text.

Consider the domain of personal finance, where customers are applying for a loan from a financial institution such as a bank. It can be assumed that the bank has a complex existing process based on a combination of data-driven approaches and business rules to arrive at a final loan approval decision. A loan officer has an option to validate the approval or denial recommendations of an AI model. The applying customer may be interested in the reasoning behind the decision, in particular, when a loan application is denied. They may want to know about a few factors that could be changed to improve their profile for possible approval in the future. Also, a data science executive may need some assurance that in most cases the recommendations made by the model are reasonable.

As a non-limiting example, a bank customer may want answers for the following questions:
Q1: Why was my application rejected?
Q2: What can I improve to increase the likelihood my application is accepted?

Providing an explanation will help them understand if they've been treated fairly, and also provide insight into what—if their application was rejected—they can improve in order to increase the likelihood it will be accepted in the future. An explainability algorithm may be utilized with a ML component to help detect both the features that a bank customer could improve (e.g., amount of time since last credit inquiry, average age of accounts), and also further detects the features that will increase the likelihood of approval and those that are within reach for the customer.

In some embodiments, a static report may be provided that indicates a the factor(s) that contributed to the decision. By way of example, a report may indicate that the customer's consolidated risk markers value is 33, but that it should be closer to 40 for the application to be approved. Additionally, the report may indicate that although the customer's average age of accounts was 43 months, the average age should be closer to 55 months in order to for his application to be approved. The report may also indicate that the customer's last credit inquiry was three months ago and it may need to be five or more months for the application to be approved. In some embodiments, rather than a static report, the decision information discussed above may be provided in conversational format, an example of which is provided below.

Question: Is my mortgage application approved
Answer: No
Question: Why was my mortgage application denied?"
Answer: The primary reason your application was denied is that your consolidated risk markers score is low.
Question: What can I do about it?
Answer: You should pay down the balances of your credit cards.
Question: What are the other reasons my mortgage application was denied?
Answer: Another reason is that the average age of your accounts is low.
Question: How do I avoid this?
Answer: There's not much you can do now except wait for your accounts to age.

The disclosed techniques are directed to generating explanations in response to a user query.

FIG. 1 depicts autonomous agent environment 100, in accordance with at least one embodiment.

FIG. 1 depicts computing device 102, data network 104, and user device 106. Computing device 102 includes one or more of autonomous agent application 108 which in turn may include a question answering engine 112. The computing device 102 may further include database 114, training data 116, database 118, classifier 120, machine-learning model 122, and explanation chain manager 124. User device 106 may include user interface 130.

User device 106 can be any mobile device such as a mobile phone, smart phone, tablet, laptop, smart watch, and the like. User device 106 communicates via data network 104 to computing device 102. Data network 104 can be any public or private network, wired or wireless network, Wide Area Network, Local Area Network, or the Internet.

In some embodiments, explanation chain manager 124 may be configured to utilize a corpus of documents stored in database 114 (e.g., documents obtained from searching the Internet or intranet or other publically or privately available data sources) to generate a number of explanation chains. An explanation within text S (e.g., a document obtained from the Internet related to mortgage loan applications) may include a chain of premises $P_1, \ldots, P_m$ which imply S. The chain of $P_1, \ldots, P_m$ may be referred to as "an explanation chain." S may be referred to as a subject of the explanation. For this explanation chain $P_1, \ldots, P_m$ each element $P_i$ is implied by its predecessors: $P_1, \ldots P_{i-1} \Rightarrow P_i$. A discourse tree may be generated from text S. A discourse tree (DT) includes nodes and edges that represent rhetorical relationships between nodes representing fragments of the text. Each nonterminal node represents a rhetorical relationship between two of the fragments. Each terminal node of the nodes of the discourse tree is associated with one of the fragments. The fragments may be referred to as "elementary discourse units" (EDUs). A path within the discourse tree may be identified where these implications are realized via rhetorical relations. A mapping may be defined between EDUs of a DT and entities $P_i$ occurring in these EDUs which can be used to form the explanation chain for the text S. In terms on underlying text, $P_i$ are entities which can be represented as logical atoms or terms. The explanation chain manager 124 may be configured to store the explanation chains it generates within database 114.

The machine-learning model 122 may be previously trained by any suitable system to identify output data from input data. The machine-learning model 122 may include one or more predictive models, classification models, neural networks, and so on. In some embodiments, machine-learning model 122 may be trained utilizing any suitable supervised learning algorithm in which a function (e.g., a model) is trained to identify output (e.g., a mortgage application decision) from provided input (e.g., user data such as the user's banking account information, credit report, a loan application, etc.) based at least in part on a training data set including input/output pairs (e.g., other user data paired with corresponding output decisions). Although the machine-learning model 122 is used in examples herein to determine mortgage loan application decisions, the machine-learning model 122 can be utilized in any suitable context to provide any suitable decision from input data. In some embodiments, the autonomous agent application 108 may be configured to train the machine-learning model 122 from training data 116 (e.g., a number of example user data (input)/decision (output) pairs), or the autonomous agent application 108 may obtain the (already trained) machine-learning model 122 from memory or another system. In some embodiments, the output (e.g., a decision) provided by the machine-learning model 122 may include a decision log which includes the specific factors (e.g., specific user data) which influenced the decision. In some embodiments, the output may be stored in database 118 and/or the input utilized by the machine-learning model 122 and the corresponding output provided by the machine-learning model 122 may be stored as additional training data with training data 116.

In an example, question answering engine 112 receives one or more user queries from user device 106. Question answering engine 112 may be configured to analyze the user query to determine what type of user request the user query poses. At a high level, there can typically be three types of requests: (1) A transactional request to perform some action, (2) a request for general information, (referred to as "a general question"), and (3) a request for personalized information (e.g., a question that requests an answer based on the user's personal information, herein referred to as a "specific question"). A transactional request corresponds to a response in which a unit of work is created and/or performed. To provide an answer to a general question, the question answering engine 112 may be configured to construct an answer from its extensive knowledge base(s) (e.g., from the documents stored in database 114). If the user has posed a specific question, the question answering engine 112 may be configured to construct an answer based on the knowledge base obtained from the corpus of documents (e.g., the explanation chains stored in database 114) as applied to specific information associated with the user (e.g., the decision log stored in database 118). The constructed answer may be provided at user device 106 via user interface 130.

Figure 2:
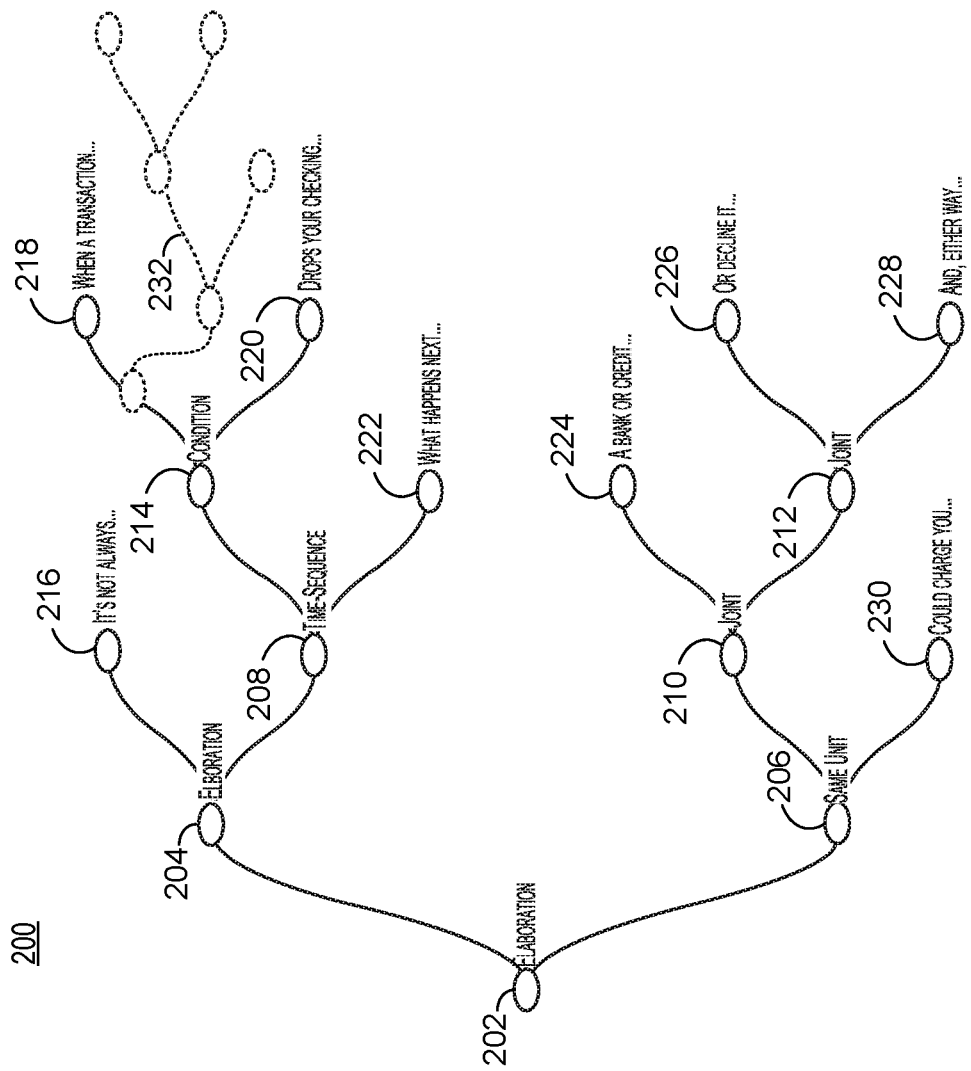
FIG. 2 depicts an example complete discourse tree of an example paragraph, in accordance with at least one embodiment.

FIG. 2 depicts an example discourse tree 200 of an example explanation, in accordance with at least one embodiment.

Certain aspects of the disclosure include generating (e.g., by the explanation chain manager 124 of FIG. 1) "complete discourse trees" (complete DT). Complete DTs may be utilized to determine an acceptability of an explanation to be provided by an autonomous agent. A "complete DT," as used herein, is intended to refer to a sum of a traditional discourse tree (DT) for a portion (e.g., a paragraph) of text and an imaginary DT for text corresponding to various entities that are used but not explicitly defined in the actual text. Thus, the imaginary DT content cannot be produced from text as parsing results. In some embodiments, the imaginary DT is inserted in the discourse tree as a sub-tree to form a complete DT.

Arcs of the discourse tree 200 correspond to rhetorical relations (RR), connecting text blocks called Elementary Discourse Units (EDU). In some embodiments, the discourse tree 200 is generated based at least in part on Rhetorical Structure Theory (RST, Mann and Thompson, 1988) and describes the discourse structure of the example explanation below. Each node in the discourse tree (e.g., nodes 202-214) corresponds to a rhetorical relationship between two portions of text corresponding each child node. The leaves (e.g., leaves 216-230) of discourse tree 200 each correspond to a particular portion of the text.

The example paragraph below provides an informal explanation in the banking domain. In the banking domain nonsufficient fund fee (NSF) is a major problem that banks have difficulties communicating with customers. The explanation includes the following:

It's not always easy to understand overdraft fees. When a transaction drops your checking account balance below zero, what happens next is up to your bank. A bank or credit union might pay for the transaction or decline it and, either way, could charge you a fee.

The concept of transaction is not addressed in this text explaining overdraft fees. An ontology could specify that transaction={wiring, purchasing, sending money} but such an ontology is difficult to complete. Instead, one can complement the notion of transaction via additional text that will elaborate on transaction, providing more details on it.

When people explain concepts or ideas, they do not have to enumerate all premises: some of them implicitly occurring in the explanation chain and are assumed by the person providing explanation to be known or believed by an addressee. However, a DT for a text containing an explanation only incudes EDUs from actual text and assumed, implicit parts with its entities and phrases (which are supposed to enter explanation sequence) are absent.

In the example provided in FIG. 2, an Elaboration relation for nucleus transaction (e.g., depicted by sub-tree 232) is not originally in the discourse tree 200 but is likely assumed by a recipient of this explanation text. Such rhetorical relations may be referred to as "imaginary" as they are not produced from text but are instead induced by the context of explanation. Such multiple imaginary RRs can be generated to form additional nodes of the discourse tree 200. The discourse tree 200 of FIG. 2 may be considered complete as it combines the actual DT (e.g., discourse tree 200) and its imaginary part (e.g., sub-tree 232). Complete discourse trees can also have communicative actions attached to their edges in the form of VerbNet verb signatures (not depicted).

Figure 3:
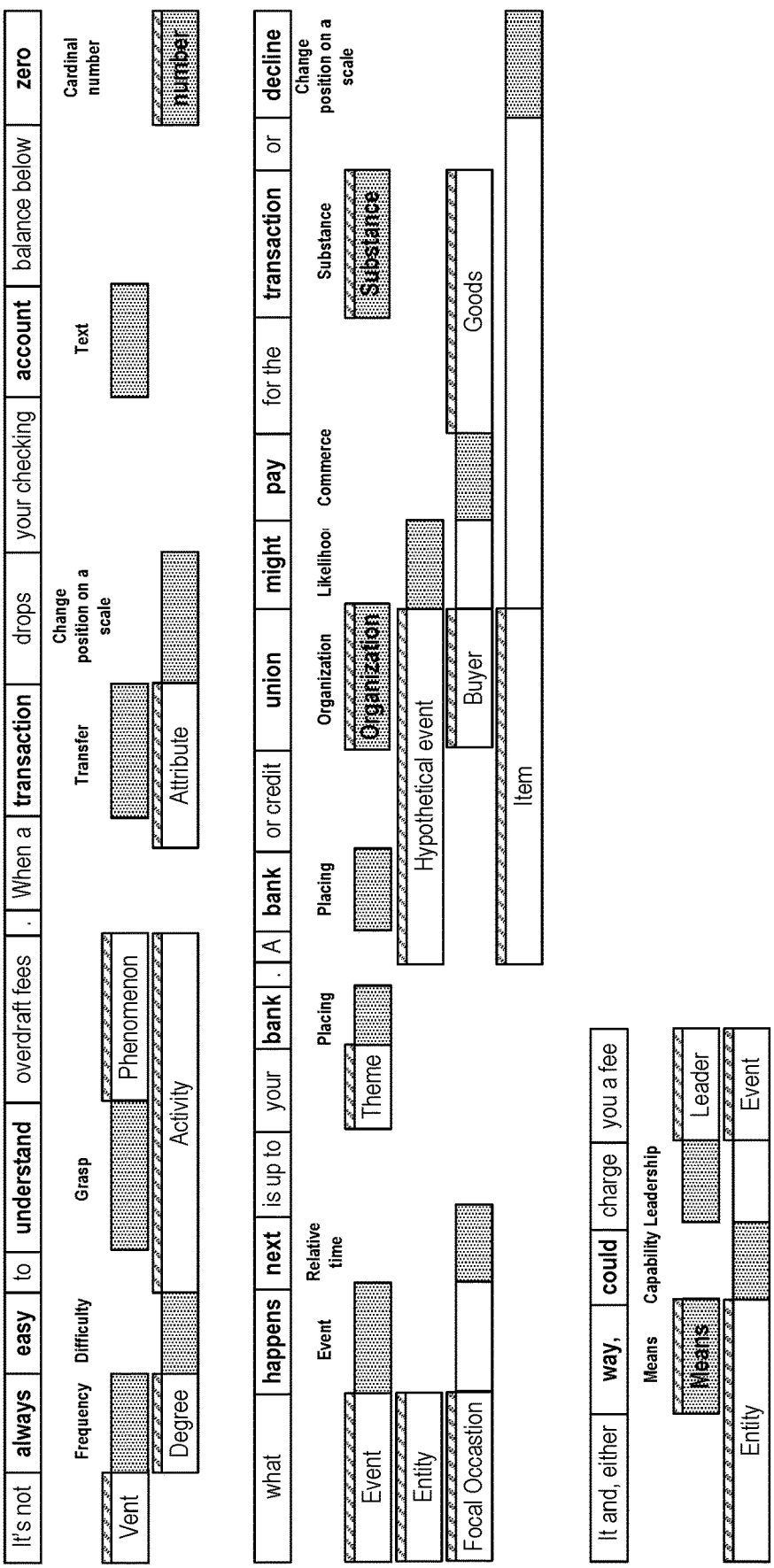
FIG. 3 depicts an example semantic parse of the example paragraph corresponding to FIG. 2, in accordance with at least one embodiment.

FIG. 3 depicts an example semantic parse of the example explanation corresponding to FIG. 2, in accordance with at least one embodiment.

A frame semantic parse for the same text is shown in FIG. 3. It is difficult, using a semantic parse to tag entities and determine context properly. Bank is tagged as Placing (not disambiguated properly) and 'credit union might' is determined as a hypothetical event since union is represented literally, as an organization, separately from credit. Overall, the main expression being explained, 'transaction drops your checking account balance below zero', is not represented as a cause of a problem by semantic analysis, since a higher level considerations involving a banking—related ontology would be required. FIG. 3 illustrates that attempting to classify explanations using a semantic parse would be ineffective. In contrast, the discourse tree 200 appears to be more suitable to classifying explanations.

FIG. 4A depicts another visualization of an example discourse tree (e.g., discourse tree 400) from which an explanation chain may be generated, in accordance with at least one embodiment.

Valid explanations in text follow certain rhetoric patterns. In addition to default relations of Elaborations, valid explanation relies on Cause, Condition, and domain-specific Comparison. An example explanation for why thunder sound comes after lightning is provided below:

'We see the lightning before we hear the thunder. This is because light travels faster than sound. The light from the lightning comes to our eyes much quicker than the sound from the lightning. So we hear it later than we see it.'

Discourse tree 400 may be generated for the explanation above. Indentation for each line shows the tree hierarchy.

Logically, an explanation within text S may include a chain of premises $P_1, \ldots, P_m$ which imply S. The chain of $P_1, \ldots, P_m$ may be referred to as "an explanation chain." S may be referred to as a subject of the explanation. For this explanation chain $P_1, \ldots, P_m$ each element $P_i$ is implied by its predecessors: $P_1, \ldots P_{i-1} \Rightarrow P_i$. In terms of a discourse tree, there should be a path in it where these implications are realized via rhetorical relations. A mapping may be defined between Elementary Discourse Units (EDUs) of a DT and entities $P_i$ occurring in these EDUs which can be used to form the explanation chain for the text. In terms on underlying text, $P_i$ are entities which can be represented as logical atoms or terms.

These implication-focused rhetorical relations (RR) may include:

1) elaboration: where $P_i$ can be an elaboration of $P_{i-1}$;
2) attribution: where $P_i$ can be attributed to $P_{i-1}$;
3) cause: this is a most straightforward case, where $P_i \Rightarrow P_j$ if RR (EDU$_i$, EDU$_j$) where $P_i \in$ EDU$_i$ and $P_j \in$ EDU$_j$. This condition can be referred to as "explainability" via Discourse Tree. The actual sequence $P_1, \ldots, P_m$ for S is not known, but for each S we have a set of good explanations $P_{g1}, \ldots, P_{gm}$ and a set of bad explanations $P_{b1}, \ldots, P_{b2}$. Good explanation chains obey the explainability via DT condition and bad explanation chains do not. Bad explanation chains might obey the explainability via DT condition for some $P_{bi}$. If a DT for a text is such that explainability via DT condition does not hold for any $P_{bi}$ then this DT does not include any explanation at all.

Each fragment of text (e.g., fragments 402-412) may be characterized as different premises and an explanation chain may be generated from the premises of the body of text according to predefined rules. In some embodiments, the explanation chain may be analyzed to determine missing premises (e.g., identifying when an entity such as a noun ("lightning") lacks a logical connection to the entity such as another noun ("light"), identifying that the entity "thunder" lacks a logical connection to the entity "sound," etc.).

One missing premise may correspond to a lack of logical connection between "quicker" and "later." Said another way, an implication is missing between a verb-group-for-moving {moves, travels, comes} faster→verb-group-for-moving-result {earlier}. This clause can be easily obtained by web mining, searching for expression 'if noun verb-group-for-moving faster than noun verb-group-for-moving-result earlier."

In some embodiments, each missing premise may be identified by determining all entities Y in the explanation chain which do not occur in expression 'Z because of Y, Y because of X'. If any of these premises (which correspond to fragments of text) are missing, they can be acquired via an imaginary DT.

For example, consider an explanation of text S is a chain of premises $P_i, \ldots, P_m$ which imply S. Each premise $P_i$ contains just a single entity corresponding to a text fragment. The set of premises can be represented as a sequence of text fragments. '$P_m$ because of $P_m=1, \ldots P_{i+1}$ because of $P_i$, $P_i$ because of $P_{i-1} \ldots, P_{i-1}$ because of $P_{i-2}$'. For each missing premise, an imaginary DT may be generated.

In some embodiments, the autonomous agent application 108 of FIG. 1 may be configured to identify text corresponding to each missing premise with which the discourse tree may be augmented. One example method is provided in FIG. 5.

FIG. 4B depicts an example complete discourse tree corresponding to the discourse tree of FIG. 4A, in accordance with at least one embodiment.

Portions 414 and 416 are intended to relate to an imaginary discourse tree that has been generated for the missing premises of the discourse tree of FIG. 4A. In some embodiments, the imaginary discourse tree portions may be obtained, as disclosed herein, by utilizing a query (e.g., against an online search database, against a corpus of documents, etc.) to generate search results from which these imaginary discourse tree portions may be mined/obtained. The discourse tree of FIG. 4A and the imaginary discourse tree portions corresponding to the missing premises of FIG. 4A may be combined to form the complete discourse tree depicted in FIG. 4B.

Figure 5:
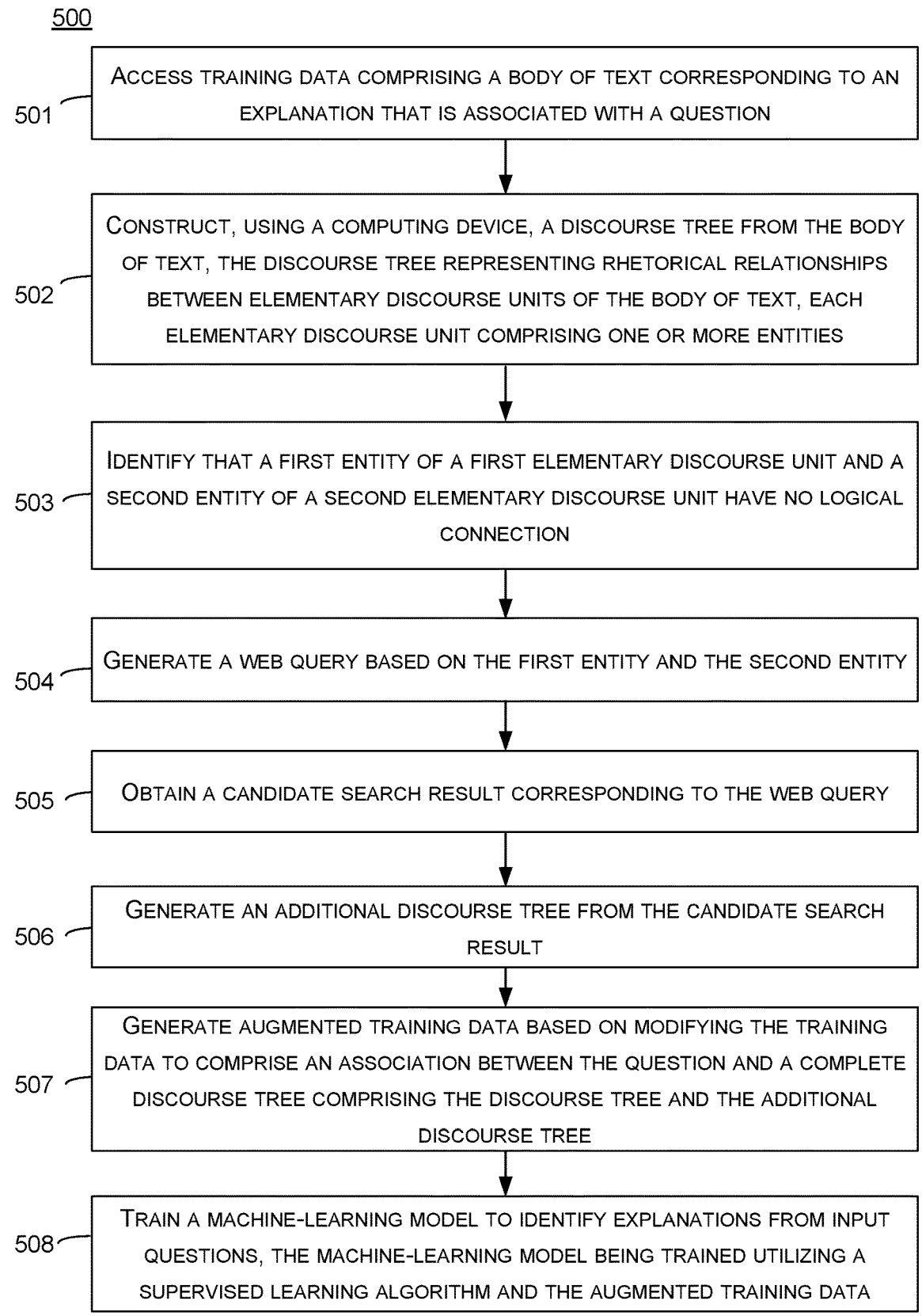
FIG. 5 illustrates an exemplary method for generating augmented training data for a machine learning model, in accordance with at least one embodiment.

FIG. 5 illustrates an exemplary method for generating an explanation chain, in accordance with at least one embodiment.

Method 500 can be performed by a computing device (e.g., the computing device 102 of FIG. 1). In some embodiments, the method 500 may be performed by the explanation chain manager 124 of FIG. 1. In some embodiments, the explanation chain manager 124 may be implemented by the autonomous agent 108 of FIG. 1. In some embodiments, computing device 102 need not execute explanation chain manager 124. Rather, the explanation chain manager 124 could run on a separate device configured to access the augmented training data generated by the computing device using the method 500.

Method 500 may begin at block 501, where training data may be accessed. The training data may comprise a question and a body of text corresponding to an explanation associated with the question. In some embodiments, the training data can comprise any suitable number of questions associated with corresponding explanations that are individually included in a body of text.

At 502, a discourse tree may be constructed from the body of text. In some embodiments, the discourse tree may represent rhetorical relationships between elementary discourse units of the body of text. An elementary discourse unit may correspond to a leaf node (e.g., any one of leaves 216-230 of FIG. 2) of a discourse tree (e.g., discourse tree 200 of FIG. 2). In some embodiments, each elementary discourse unit may comprise one or more entities (e.g., nouns, verbs, phrases, etc.).

At 503, it may be identified that a first entity of a first elementary discourse unit (e.g., a noun, verb, phrase, etc.) and a second entity of a second elementary discourse unit (e.g., a noun, verb, phrase, etc.) have no logical connection. By way of example, as described above in connection with FIG. 4, an explanation chain may be generated from the elementary discourse units of the body of text. In some embodiments, the explanation chain may include premises corresponding to the EDUs and indications of logical connections between the EDUs. Using the explanation chain, the computing device can determine that the first entity of a first elementary discourse unit and a second entity of a second elementary discourse unit have no logical connection based on determining that a premise is missing that links the first entity to the second entity.

At 504, a query may be generated based on the first entity and the second entity. By way of example, one example query may be 'if noun verb-group-for-moving faster than noun verb-group-for-moving-result earlier." A query, as used herein, may be a web query, a search query used against a corpus of documents, and the like.

At 505, a candidate search result corresponding to the web query may be obtained. In some embodiments, multiple candidate search results may be identified in response to executing the web query (e.g., by a web search engine). In some embodiments, a set of discourse trees may be generated corresponding to each of the set of candidate search results. A subset of the set of discourse trees may be identified that indicate a logical relationship that links the first fragment and the second fragment within the explanation chain. Each of the subset of the set of discourse trees may be scored based on a degree of relevancy between each candidate search result and the question. In some embodiments, the candidate search result may be obtained when the discourse tree corresponding to the candidate search results is selected based on its score.

At 506, an additional discourse tree (e.g., sometimes referred to above as an imaginary discourse tree) may be generated from the candidate search result.

At 507, augmented training data may be generated based on modifying the training data to comprise an association between the question and a complete discourse tree comprising the discourse tree and the additional discourse tree. In some embodiments, the complete discourse tree may be generated by combining the discourse tree and the additional discourse tree (e.g., an imaginary discourse tree that is obtained, not through parsing the original text, but by mining search data). In some embodiments, the question may be additionally, or alternatively, associated with an explanation chain generated using the complete discourse tree.

At 508, a machine-learning model may be trained to identify explanations from input questions. In some embodiments, the machine-learning model may be trained utilizing a supervised learning algorithm and the augmented training data. For example, the augmented training data may include various examples of a question, an explanation chain of a body of text from which an answer was provided, and the answer provided in response to the question.

As a non-limiting example, imaginary DTs may be built on demand to augment the DTs built from the actual text. By way of example, a given chain $P_i, \ldots, P_i', \ldots, P_m$ let $P_i'$ be the entity which is not explicitly mentioned in a text but instead is assumed to be known to the addressee. To make the explainability via DT condition applicable, the actual $DT_{actual}$ can be augmented with imaginary $DT_{imaginary}$ such that $P_i' \in EDU$ of this $DT_{imaginary}$. We denote $DT_{actual}$ $DT_{imaginary}$ as $DT_{complete}$. If textual explanations are provided in the positive set of good explanations for the same S, $T_1$ and $T_2$.

$T_1: P_1, \ldots, P_m \Rightarrow S$
$T_2: P_1, P_i', \ldots, P_m \Rightarrow S$ then it can be assumed that $P_i'$ should occur in a complete explanation for S and since it does not occur in $T_1$ then $DT(T_1)$ should be augmented with $DT_{imaginary}$ such that $P_i' \in EDU$ of this $DT_{imaginary}$.

It should be appreciated that, in some embodiments, the techniques discussed above may be utilized to classify explanations as being either "complete" or "incomplete." For example, in some embodiments, a body of text corresponding to an explanation may be accessed. A discourse tree may be generated from the body of text (e.g., using rhetorical structure theory). An explanation chain may be generated from the discourse tree's elementary discourse units (e.g., leaves of the discourse tree). In some embodiments, the explanation may be classified as "complete" when there are no missing logical connections between the premises of the explanation corresponding to the EDUs of the discourse tree. Alternatively, the explanation may be classified as "incomplete" when there are missing logical connections between the premises of the explanation corresponding to the EDUs of the discourse tree.

Although FIG. 5 includes steps for generating a complete discourse tree, in some embodiments, an explanation chain may be generated from the discourse tree (e.g., when the discourse tree is already complete) without generating an additional discourse tree (e.g., performing 504-506).

Figure 6:
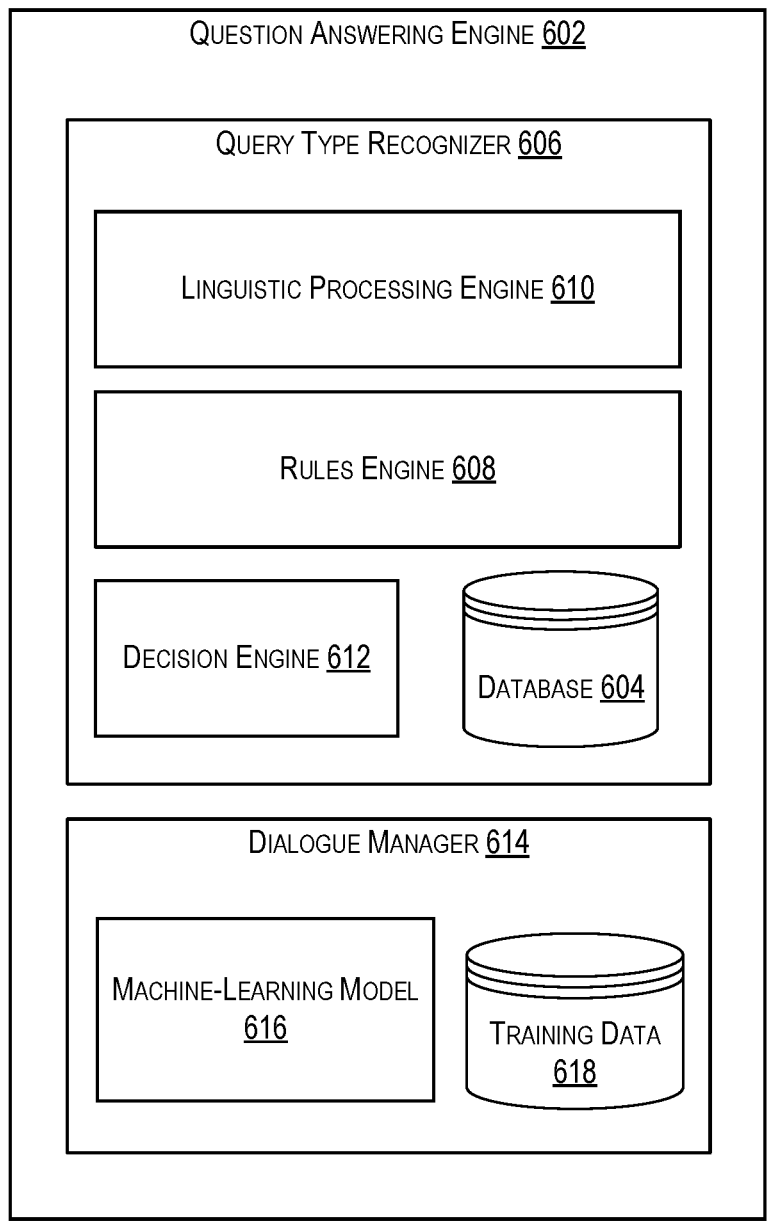
FIG. 6 depicts a schematic diagram of computing components of a question answering engine, in accordance with at least one embodiment.

FIG. 6 depicts a schematic diagram of computing components of a question answering engine 602 (an example of the question answering engine 112 of FIG. 1), in accordance with at least one embodiment.

The question answering engine 602 may include a number of modules. These modules may be software modules, hardware modules, or a combination thereof. If the modules are software modules, the modules can be embodied on a computer readable medium and processed by a processor in any of the computer systems described herein. It should be noted that any module or data store described herein, may be, in some embodiments, a service responsible for managing data of the type required to make corresponding calculations. The modules, or some portion of the modules, may be operate as part of the autonomous agent application 108 of FIG. 1.

In the embodiment shown in the FIG. 6, database 604 is shown, although data can be maintained, derived, or otherwise accessed from various data stores, either remote or local to the question answering engine 602, to achieve the functions described herein. In at least one embodiment, the data store described herein may be physically located on the computing device 102 of FIG. 1, or alternatively, the data store may be local and/or otherwise accessible to the computing device 102. The question answering engine 602, as shown in FIG. 6, includes various modules such as a query type recognizer 606 and a dialogue manager 614. Some functions of the modules are described below. However, for the benefit of the reader, a brief, non-limiting description of each of the modules is provided in the following paragraphs.

The query type recognizer 606 may be configured to classify a question as being a general question (e.g., a question for which an answer does not depend on user data) or a specific question (e.g., a question for which an answer depends on user data). In some embodiments, a question can be classified into one of the following types:

1) General question: requests a general fact. (e.g., 'Is my interest rate up due to slow down in the economy?', 'Am I charged a fee because the bank has to borrow money to cover my negative balance?', etc.);

2) Specific question:
   a. where user data affects the answer: 'Am I charged NSF because my paycheck was delayed?', 'Did my interest rate go up due to a high number of my credit card accounts?';
   b. Other kinds of specific questions such as 'What is my account balance?';
   c. Specific questions such as 'Why' questions associated with user data: 'Why was I charged NSF when my paycheck was greater than what I paid for?';
3) Request to perform a transaction (also referred to as a transaction request).

In some embodiments, the user may provide a series of requests that can include a mixture of general questions, specific questions, and/or transactional requests. By way of example, before a user wants to request a particular personal financial information or perform an action (such as open a new bank account), she might ask a general question (e.g., what are the rules and conditions for this type of account?). Once the user is satisfied, she may make a decision and order a transaction (e.g., open a new bank account). Once this transaction is completed, the user might ask a specific question (such as 'what is my account balance?'). Hence general questions, specific questions, and transactional requests are intermittent and need to be recognized reliably.

A request for general information, personal/specific information, or a transaction request can be formulated explicitly or implicitly. 'Could you do this' may mean both a question about the access control as well as an implicit request to do this. Even a simple question 'When is my payment due? Pay now' may be a factoid question or a transactional request to select an account and execute a database query. Another way to express a request is via mentioning of a desired state instead of explicit action to achieve it. For example, utterance 'I am short of funds in my checking account #2' indicates not a question but a desired state that can be achieved by transferring funds. To handle this ambiguity in a domain-independent manner, these types of questions and requests may be differentiated linguistically. An utterance (e.g., a user query) may be classified as a transactional request or a question (e.g., a general question or specific question) based on two levels: 1) keyword level, and 2) linguistic analysis of phrases level).

In some embodiments, database 604 of the query type recognizer 606 may include classification data such as question intent prefixes, mental verbs, imperative verbs, request suffixes, request prefixes, request verbs, stop prefixes, or any suitable data with which a user query may be classified as a general question, specific question, and/or transactional request. Other vocabulary words or words learned over time are possible. Such classification data can be arranged in one or more arrays, lists, databases, or other data structures. By way of example database 604 may include expressions used by an utterance author to indicate the he wants an agent (e.g., the autonomous agent application 108) to do something, such as 'Please conduct . . . for me'. These expressions also refer to information requests such as 'Give me MY . . . ' (for example, current account yield). For a question, this vocabulary includes the ways people address questions, such as 'please tell me . . . '.

The rules engine 608 may be configured to employ a set of rules (e.g., a set of transactional request identification rules, general question identification rules, specific question identification rules, etc.), including the keyword-based, vocabulary-based and linguistic ones against a user query to determine a classification for the user query (also referred to as "an utterance"). The rules may be applied in a particular, predefined order, oriented to first find indication of a transactional request. In some embodiments, if the user query is not classified by the rules engine 608 as being a transactional request, the rules engine 608 may then employ a set of general question and/or specific question identification rules. If the user query is not identified as a question (e.g., general or specific), the user query may be classified as 'unknown'. By default if no rule applies to the user query, the user query may be treated as a general question.

Linguistic processing engine 610 may be configured to perform one or more stages of linguistic analysis of the utterance. For example, linguistic processing engine 610 can detect a presence of a leading verb and a reference to an object in the possessive (e.g., "my house"). Linguistic engine 130 can parse the utterance and attempt to match the parsed utterance to one or more templates stored in database 604. The rules engine 608 may utilize these matches in order to identify whether the utterance is a general question, a specific question, or a transactional request. Examples of templates include string templates and linguistic templates. String templates detect the presence of a string in an utterance, whereas linguistic templates determine a presence of a match of a one or more specific types of words (e.g., noun, verb, pronoun).

In some embodiments, the linguistic processing engine 610 is designed to work with two templates: imperative leading verb and a reference to "MY" object. Once parsing is done, the first word should be a regular verb in present tense, active voice, neither modal, mental or a form of 'be'. These constraints assure this verb is in the imperative form 'Drop the temperature in the room'. The second case addresses utterance related to an object the author owns or is associated too, such as 'my account balance' and 'my car'. These utterances are connected with an intent to perform an action with these objects or request for an information on them (versus a question which expresses a request to share general knowledge, not about this particular, my object).

Linguistic processing engine 610 may identify one or more vocabulary words or template matches in an utterance by using the classification data described herein. In some embodiments, each match outcome can be weighted by a set of rules. As such, a particular match alone is not necessarily deterministic of a particular classification.

In some embodiments, database 604 may store question intent prefixes (e.g., a portion of the classification data discussed herein). Question intent prefixes may be utilized by the linguistic processing engine 610 and may include prefix words that may be utilized to identify a question within an utterance. For example, an utterance including "I want to know" includes question intent prefix "I want." Examples of intent prefixes are shown below in Table 1. Question intent prefixes may include misspellings and informal variants that may be expected with shorthand or Internet-based communications.

TABLE 1

| Question Intent Prefixes | |
| --- | --- |
| can you tell | can you explain |
| please tell | please inform |
| why | how to |
| how much can | how do i |
| do i | how can |
| what's the cause | whats the cause |
| what is the cause | what s the cause |
| what's the difference | whats the difference |
| what is the difference | what s the difference |

TABLE 1-continued

Question Intent Prefixes

| | |
|---|---|
| what's the reason | whats the reason |
| what is the reason | what s the reason |
| how much money | show how |
| show me how | i need to know |
| i want to know | where can |

In some embodiments, database 604 may store a set of mental verbs (e.g., a portion of the classification data discussed herein). Mental verbs may include verbs that relate to mental activities. Examples include "know," "think," "recognize," and so on. Mental verbs can include variants of each verb in a different tense (e.g., know, knew, thought, etc.). Upon detecting a presence of one or more mental verbs, rules engine 608 may be configured to classify an utterance as a question.

The database 604 may include imperative verbs (e.g., a portion of the classification data discussed herein). The linguistic processing engine 610 can be utilized to identify within the utterance, the imperative verbs, verb phrases, and variants such as misspellings, verbs with incorrect punctuation, or different tenses of the same verb. Upon detecting a presence of one or more imperative verbs by the linguistic processing engine 610, the rules engine can classify the utterance as a transactional request. Table 2 illustrates some examples of imperative verbs and variants.

TABLE 2

Example Imperative Verb Phrases and Variants

| | | |
|---|---|---|
| do not | please do not | don't |
| please dont | "don t" | "please don t" |
| i want to | "i don t want to" | "i don't want to" |
| "i want you do" | i dont want you to", | i don t want u to |
| "can you" | could you | can u |
| could u | what is my | where are my |
| when are my | i need | i want |
| it is | is it | what is the time |
| what day | what year | |

In some embodiments, linguistic processing engine 610 may determine that the first word in an utterance is either a verb in the present tense, a verb in active voice, and neither modal, mental, or a form of the word "to be." Such constraints ensure, for example, that the verb is in the imperative form, e.g., "drop the temperature in the room."

In another aspect, linguistic processing engine 610 can also detect whether an utterance is related to an object the author of the utterance owns or is associated with. Examples include "my account balance" and "my car." The rules engine 608 can utilize the existence of these types of objects in the utterance to classify the utterance as being a specific question rather than a general question that expresses a request to share general knowledge not about the particular object(s).

In a further aspect, linguistic processing engine 610 can determine additional verb variants. Verb variants include identifying additional verbs such as with prefixes "re," "dis," or "un." Examples include "re-load," "re-heat," "disassemble," and "unmake." In a further aspect, linguistic processing engine 610 maintains a list of imperative verb prefixes "can you" as in "can you turn on the light." The rules engine 608 can utilize the detection of can such prefixes to classify the utterance as a transactional request.

To assist with determining whether an utterance is a transactional request, linguistic processing engine 610 can access a set request suffixes to determine whether any of these request suffixes occur within the utterance. Request suffixes include adjectives that describe a state, such as a state of an object. Table 3 depicts examples of request suffixes.

TABLE 3

Request Suffixes

| | |
|---|---|
| off | on |
| please | hot |
| cold | |

To assist with determining whether an utterance is a transactional request, linguistic processing engine 610 can access a set of request prefixes to determine whether any of these request prefixes occur within the utterance. Request prefixes include leading adjectives. Table 4 depicts examples of transaction suffixes.

TABLE 4

Request Prefixes

| | |
|---|---|
| too | more |

Request verbs may include a set of verbs that indicate a transaction request or that do not indicate a transactional request. Examples of request verbs may also include "get," "set," bring," and "withdraw." If linguistic processing engine 610 detects one or more of the verbs that indicate a transaction request within the utterance, the rules engine 608 may be configured to classify the utterance as a transactional request. In some embodiments, the linguistic processing engine 610 can detect one or more verbs in the utterance that do not indicate a transactional request. In some embodiments, the rules engine 608 can ignore the presence of such words in the utterance and/or the rules engine 608 can utilize the presence of such words to determine that the utterance is not a transactional request. Table 5 depicts examples of verbs that indicate transactional requests and an absence of a transactional request.

TABLE 5

| Verbs indicating a transactional request | | | Verbs not indicating a transactional request |
|---|---|---|---|
| answer | get | consume | burn |
| approve | take | continue | bet |
| avoid | begin | adjust | dig |
| base | build | adopt | dream |
| block | break | check | drink |
| send | give | complain | feel |
| receive | carry | close | forgive |
| bill | classify | complete | forget |
| connect | clear | confine | hear |
| consider | consume | credit | hurt |
| continue | contribute | convert | mean |

Database 604 may store stop prefixes (e.g., a portion of the classification data discussed herein). Stop prefixes include words or prefixes that a user might add to the beginning of an utterance such as "please." In an aspect, stop prefixes can be removed by linguistic processing engine 610 so as to not interfere with other processing. Table 6 illustrates examples of stop prefixes.

TABLE 6

| Stop Prefixes | |
| --- | --- |
| please | I |
| we | kindly |
| pls | |

Database 604 may store any suitable number of templates (e.g., a portion of the classification data discussed herein). In some embodiments, the linguistic processing engine 610 applies one or more of these templates to an utterance. Templates can include syntax-based templates or linguistic templates. An example syntax-based template is whether an utterance contains "how to" or "if."

In some embodiments, the rules engine 608 itself does not classify the utterance. Rather, in some embodiments, decision engine 612 may receive output(s) of the rules engine 608 and/or the language processing engine 610 and determines a classification for the utterance based on the output(s). If any of the components failed while applying a rule, the resultant decision may be determined to be "unknown". In some embodiments, the rules engine 608 and/or the decision engine 612 may be configured to cause a set of operations to be performed in response to identifying the utterance as containing a transaction request. The set of operations performed may depend on the particular transaction request. In some embodiments, the rules engine 608 and/or the decision engine 612 may output (e.g., to a separate system, not depicted) data indicating the utterance is a transaction request, and the output may be utilized (e.g., by the separate system) to determine one or more operations to be performed.

In some embodiments, the question answering engine 602 may include dialogue manager 614. The dialogue manager may be configured to determine an answer for a question (e.g., a general question, a specific question, as determined by the query type recognizer 606). In some embodiments, the dialogue manager 614 may utilize a machine-learning model 616. Machine-learning model 616 may be previously trained utilizing any suitable machine-learning techniques (e.g., supervised learning, unsupervised learning, reinforced learning, neural networks, deep learning, etc.) to identify an answer based at least in part on a question determined from the user query (e.g., the utterance). The machine-learning model 616 may be previously trained to identify answers based at least in part on training data 618 (e.g., example pairs of questions and corresponding answers). In some embodiments, the machine-learning model 616 may be trained using augmented training data (e.g., training data 618) as described in FIG. 5. The training may be performed by the explanation chain manager 124 of FIG. 1, or a separate system that utilizes training data comprising examples of a question, an explanation chain generated from a body of text from which an answer was provided, and the answer provided in response to the question.

In some embodiments, the dialogue manager 614 may be configured to utilize question answer templates. Some example question answer templates are provided below.
   General Question
      General (factoid) Answer
   FoC1 Question 1
      confirmation and Factoid+FoC Answer
   FoC2 Question
      negation of FoC2+Factoid
   Why.Decision_Log.FoC1 Question
      Why.Decision_Log.FoC1 Answer+Why.Decision_Log.FoC2 Answer+temporal_sequence(Why.Decision_Log.FoC1)

These question/answer templates may be utilized by the dialogue manager 614 to generate an answer to a question. Some example questions and corresponding answers generated from the corresponding question answer templates above are provided below:
   When am I getting an NSF fee?
      You are charged a NSF fee when your balance goes below zero
   Did my balance go below zero?
      Yes. Your balance was −$24.43 on Monday, Jan. 7, 2019
   Was my pay check used against my payments
      No. Your balance was −$24.43. Only available funds in a checking account can be used for your debit transaction
   Why wasn't my paycheck used?
      Your paycheck was debited in ATM on Sun Jan. 6, 2019 and processed by the end of day Mon Jan. 7, 2019

Figure 7:
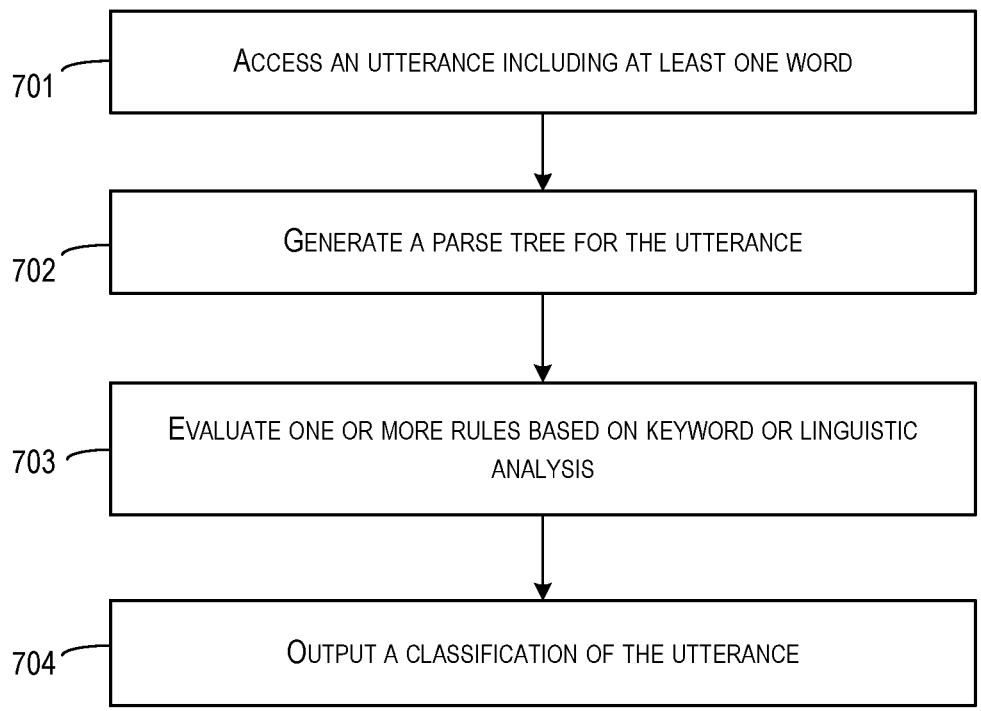
FIG. 7 depicts a flowchart illustrating an example of a process for discriminating between questions and a request in accordance with at least one embodiment.

FIG. 7 depicts a flowchart illustrating an example of a process 700 for discriminating between questions and a request, in accordance with at least one embodiment.

In some embodiments, the process 700 may be performed by the query type recognizer 606 of FIG. 6.

At block 701, process 700 involves accessing an utterance including a word. Examples of utterances include short phrases such as "stop," longer phrases such as "turn off the heat," or "how do I check my portfolio?," or "why did my loan application get rejected?" Query type recognizer 606 can access an utterance from a process or application (e.g., autonomous agent application 108 of FIG. 1) executing on computing device 102 or from another computing device such as a user device (e.g., the user device 106 of FIG. 1).

In some embodiments, query type recognizer 606 (e.g., linguistic processing engine 610, a component of the query type recognizer 606) preprocesses an utterance to remove stop prefixes. Removing stop prefixes can prevent errors including ignoring words that are in a second or subsequent position in the utterance but indicate a particular classification.

At block 702, process 700 involves generating a parse tree for the utterance. By way of example, linguistic processing engine 610 may generate a parse tree. The parse tree may include any suitable number of nodes. Each node may identified as a particular type of the types below, provided in Table 7 (although other types are possible).

TABLE 7

| Notation | Description |
| --- | --- |
| S | Sentence |
| NP | Noun Phrase |
| VP | Verb Phrase |
| V | Verb |
| D or DOBJ | determiner |
| N | Noun |
| RP | Phrasal verb particle |

Standard parsers can be used such as the Stanford NLP parser to generate the parse tree at block 702.

At block 703, process 700 involves evaluating (e.g., by the rules engine 608 of FIG. 6) one or more rules based on keyword or linguistic analysis. Query type recognizer 606 can use the parse tree or the utterance (i.e., text) as input to any of the rules.

Figure 8:
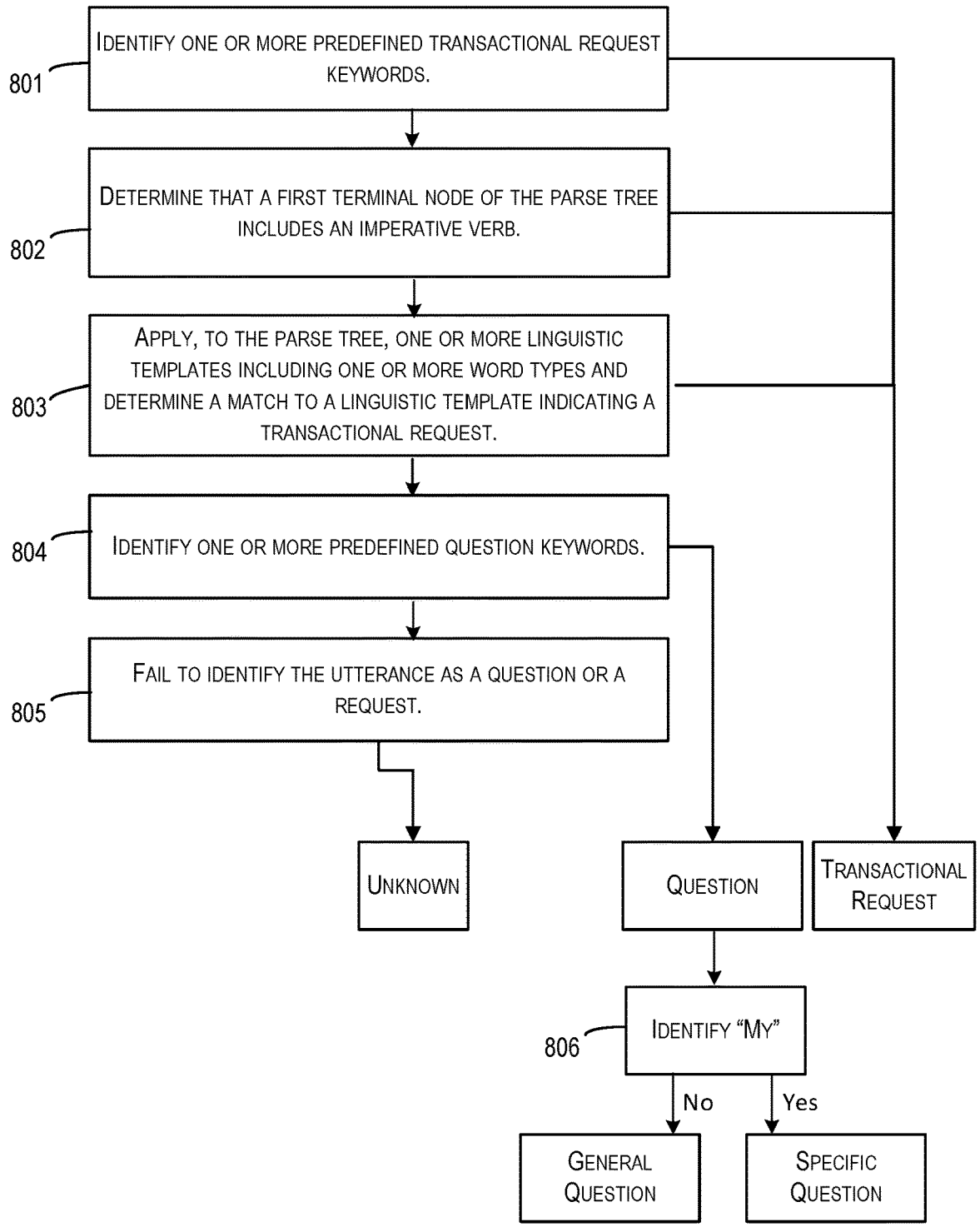
FIG. 8 depicts a flowchart illustrating examples of rules used for discriminating between a question and a request, in accordance with at least one embodiment.

FIG. 8 depicts a flowchart illustrating examples of rules used for discriminating between questions (e.g., a general question, a specific question) and a transaction request, in accordance with at least one embodiment.

Query type recognizer 606 (or rules engine 608, a component of Query type recognizer 606) can execute one or more of blocks 801-805 individually, in combination, and in any order. Different priority orders are possible. For example, if query type recognizer 606 determines that block 801 has successfully executed, then query type recognizer 606 can output a classification of "transactional request," and return to block 804. In another example, if query type recognizer 606 executes block 502, but does not identify any transactional request keywords, then query type recognizer 606 can continue to one of blocks 802-805.

At block 801, process 800 involves identifying one or more predefined transactional request keywords. Predefined transactional request keywords can include request suffixes, request prefixes, and request verbs (see tables 3-5 above). A presence of one or more of these keywords indicates a transactional request. Table 8 depicts sentences identified as transactional requests and illustrates the analysis performed in each case.

TABLE 8

| Sentence | Analysis |
| --- | --- |
| Turn the light on | request suffix "on" |
| Put wiper rate on high | request suffix "high" |
| set the security system to off | request suffix "off" |
| too loud, quieter please | request prefix "too" |

More specifically, each type of the transactional request keywords can have an associated position in which the keyword is expected. For example, query type recognizer 606 searches for a request prefix in the first word position of the utterance, request suffixes in the last word position in the utterance, and request verbs at any position in the utterance.

At block 802, process 800 involves determining that a first terminal node of the parse tree includes an imperative verb. The query type recognizer 606 (e.g., the linguistic processing engine 610) generates a parse tree representing the utterance and identifies an imperative verb from a set of predefined imperative verbs (see table 2 above). If a leading imperative verb, or a verb in the first word position of the utterance, is identified, then query type recognizer 606 can output a classification of "transactional request," and processes 500 and 400 can terminate. Table 9 depicts examples of utterances identified as requests based on a presence of imperative verb.

TABLE 9

| Sentence | Imperative Verb |
| --- | --- |
| Open a reoccurring deposit | open |
| Cancel a reoccurring deposit | cancel |
| Help me to log in | help |
| Transfer funds from checking to saving | transfer |
| Move funds from saving to mortgage | move |

TABLE 9-continued

| Sentence | Imperative Verb |
| --- | --- |
| Close the garage door | close |
| do western union | do |

In an embodiment, query type recognizer 606 can weigh different factors. For example, in the case that query type recognizer 606 (e.g., linguistic processing engine 610) detects a presence of a leading verb, indicating a request, the presence of "how" in the utterance, can negate a presence of a leading verb and indicate a question. In that case, query type recognizer 606 (e.g., rules engine 608, a component of the query type recognizer 606) may classify the utterance as a question.

Additionally, query type recognizer 606 can detect the presence of a first-person pronoun such as "me" or "my." More specifically, in a case in which a leading verb is a mental verb, typically indicating a question, the presence of "me" or "my" can nevertheless indicate a request. Therefore, in the case of a mental verb in conjunction with "me" or "my," query type recognizer 606 classifies the utterance as a transactional request. Table 10 depicts examples of utterances identified with these rules.

TABLE 10

| Sentence | Analysis |
| --- | --- |
| Give me checks deposited in Bank Account but not credited | [leading imperative verb + me] leading verb identified "give," and a presence of "me" identified. Classified as a transactional request. |
| Fund my investment account from checking | Leading verb identified "fund" and "my" identified in an absence of "how." Classified as a transactional request. |
| Wire money from my checking to investment | Leading verb identified "fund" and "my" identified in an absence of "how." Classified as a transactional request. |
| Thinking about checking accounts. | Leading mental verb. Classified as general question. |
| Thinking about my checking account. | Leading mental verb "thinking" in combination with "my." Classified as a specific question. |

If no leading imperative verb match is found, then process 800 can continue to one or more of block 801, or 803-805 for further evaluation.

At block 803, process 800 involves applying, to the parse tree, one or more linguistic templates and determining a linguistic template match. The linguistic template can include one or more word types (e.g., verb). More specifically, query type recognizer 606 (e.g., the linguistic processing engine 610) determines a match by determining that the one or more word types are present in the parse tree. An example of a template is a presence of a pronoun followed by a noun (represented by PR+NN). A match of this template can indicate a transactional request. For example, "give me my balance" or "get me my balance," where the pronoun is "my" and the noun is "balance." Conversely, query type recognizer 606 does not categorize the utterance "tell me how to check an account balance" as a transactional request due to the absence of the pronoun.

At block 804, process 800 involves identifying one or more predefined question keywords. Examples of question keywords include question intent prefixes (see table 1) and mental verbs. A presence of one or more of these keywords indicates that the utterance is a question. If the keywords further includes "my" (as identified at block 806), the question may be classified as a "specific question," else the question may be classified as a general question. Table 10 depicts examples of sentences in which one or more question keywords are identified by classification application 102.

TABLE 10

| Sentence | Analysis |
| --- | --- |
| I am anxious about spending my money | [mental verb] classified as a specific question |
| I am worried about my spending | [mental verb] classified as a specific question |
| I am concerned about how much I used | [mental verb] classified as a specific question |
| I am interested how much money I lost on stock | [mental verb] classified as a specific question |
| How can my saving account be funded | [How + my] classified as a specific question |
| If I do not have my Internet Banking User ID and Password, how can I login? | [if and "how can I"-prefix] classified as a general question |

In some cases, query type recognizer 606 can default to a particular classification if the rules for other classifications are not applied. For example, if no requests are identified in the utterance "domestic wire transfer," then query type recognizer 606 identifies the utterance as a general question. Table 11 identifies additional cases.

TABLE 11

| Sentence | Analysis |
| --- | --- |
| Domestic wire transfer | [no transactional rule fired therefore classified as a general question] |
| order replacement/renewal card not received | [no transactional rule fired therefore classified as a general question] |

At block 805, process 800 involves failing to identify the utterance as a question (general or specific) or a transactional request. If no rule successfully identifies the utterance as a question or transactional request, then autonomous agent application 108 of FIG. 1 can ask the user for further clarification.

Returning to FIG. 7, process 700 involves outputting the classification at 704. The autonomous agent application 108 can receive the classification and take action accordingly. Based on an identified classification, autonomous agent application 108 can take some action such as further interaction with user device 106.

Figure 9:
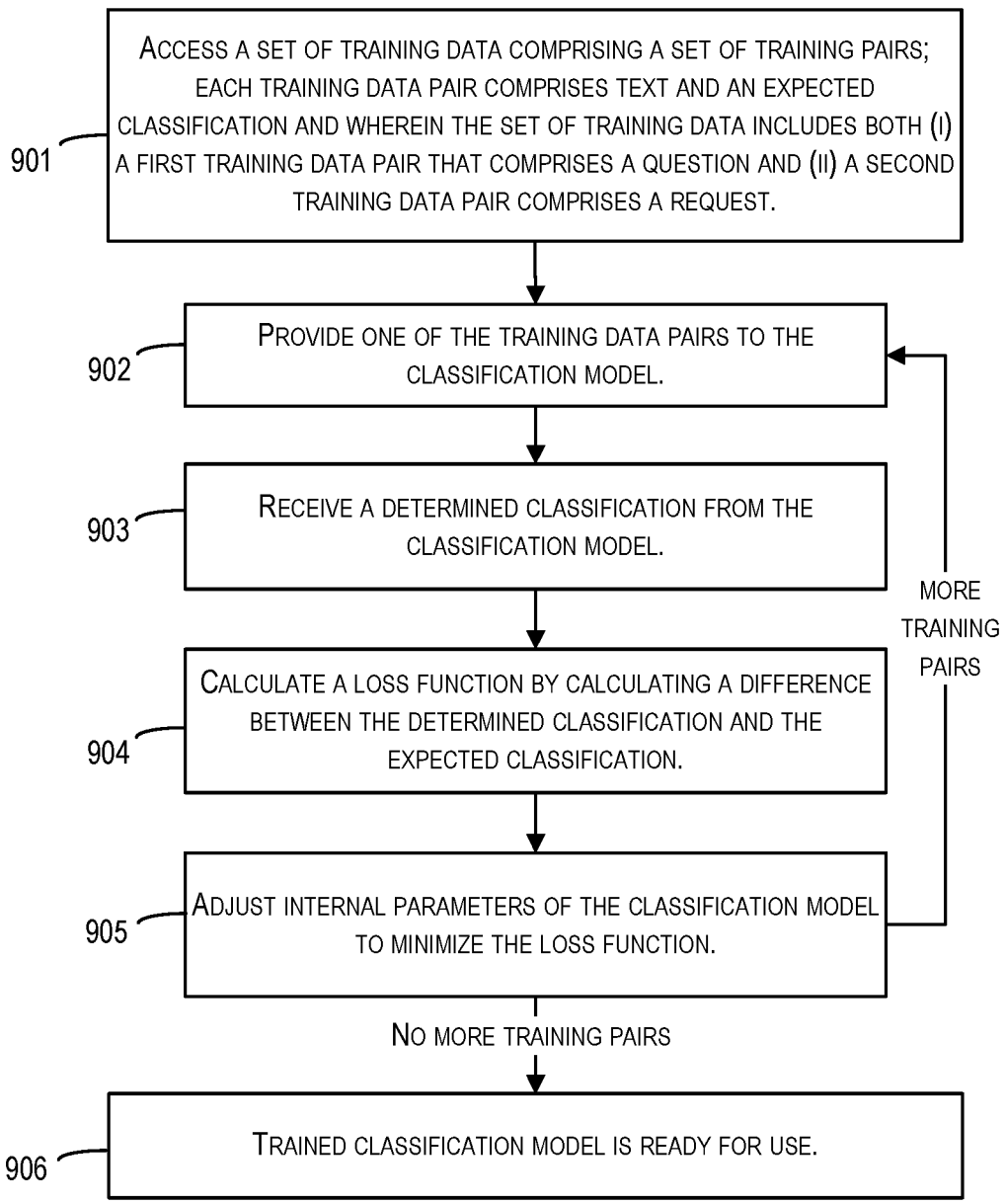
FIG. 9 depicts a flowchart of an exemplary process for training a machine learning model to detect whether an utterance is a question or a request, in accordance with at least one embodiment.

FIG. 9 depicts a flowchart illustrating an example of a process 900 for training a classification model to determine informative text for indexing, in accordance with an aspect.

In process 900, a classification model can be trained to discriminate between questions (general or specific) and transactional requests. Training data for such a classification model can include multiple training sets, such as a training set with text identified as transactional requests, another training set with text identified as general questions, and yet another training set with text identified as specific questions.

In some embodiments, the training data can include text and/or associated parse trees of the various instances of the training sets.

At block 901, process 900 involves accessing a set of training data comprising a set of training pairs. Each training data pair comprises text (or a parse tree of the text) and a predefined classification (e.g., general question, specific question, transactional request). The text (or parse tree) may be an example user query for which a classification has previously been determined.

At block 902, process 900 involves providing one of the training data pairs to the classification model. Accordingly, the classification model receives a body of text and the expected classification.

At block 903, process 900 involves receiving a determined classification from the classification model.

At block 904, process 900 involves calculating a loss function by calculating a difference between the determined classification and the expected classification. Different loss functions are possible such as mean-square error, likelihood loss, log (or cross entropy) loss, etc.

At block 905, process 900 involves adjusting internal parameters of the classification model to minimize the loss function. In this manner, the classification model learns to improve the accuracy of its predictions with each iteration of training.

At block 906, process 900 involves using the trained classification model. For example, the trained classification model can be used by the query type recognizer 606 (e.g., in lieu of or in addition to utilizing the functionality of linguistic processing engine 610 and/or rules engine 608 and/or decision engine 612) to identify whether an utterance indicates a general question, a specific question, or a transactional request.

For example, to use the trained classification model for identifying an utterance indicates a general question, a specific question, or a transactional request, query type recognizer 606 can access an utterance of text and generate a parse tree for the utterance. Query type recognizer 606 determines a classification of the utterance by applying the classification model to the parse tree.

In turn, query type recognizer 606 can use one of several methods to determine a classification. For example, classification model may determine a first similarity score indicating a first match between the utterance and training example(s) identified as a general question, a second similarity score indicating a second match between the utterance and training example(s) identified as a specific question, and a third similarity score indicating a third match between the utterance and training example(s) identified as a transactional request.

The classification model may output a classification based on the first similarity score, the second similarity score, and the third similarity score. For example, if the first similarity score is higher than the second and third similarity scores, then classification model may output a classification of "general question." If the second similarity score is higher than the first and third similarity scores, then classification model may output a classification of "specific question." If the third similarity score is higher than the first and second similarity scores, then classification model may output a classification of "transactional request." In some cases, for example, if an error occurs, then classification model can output a classification of "unknown."

Figure 10:
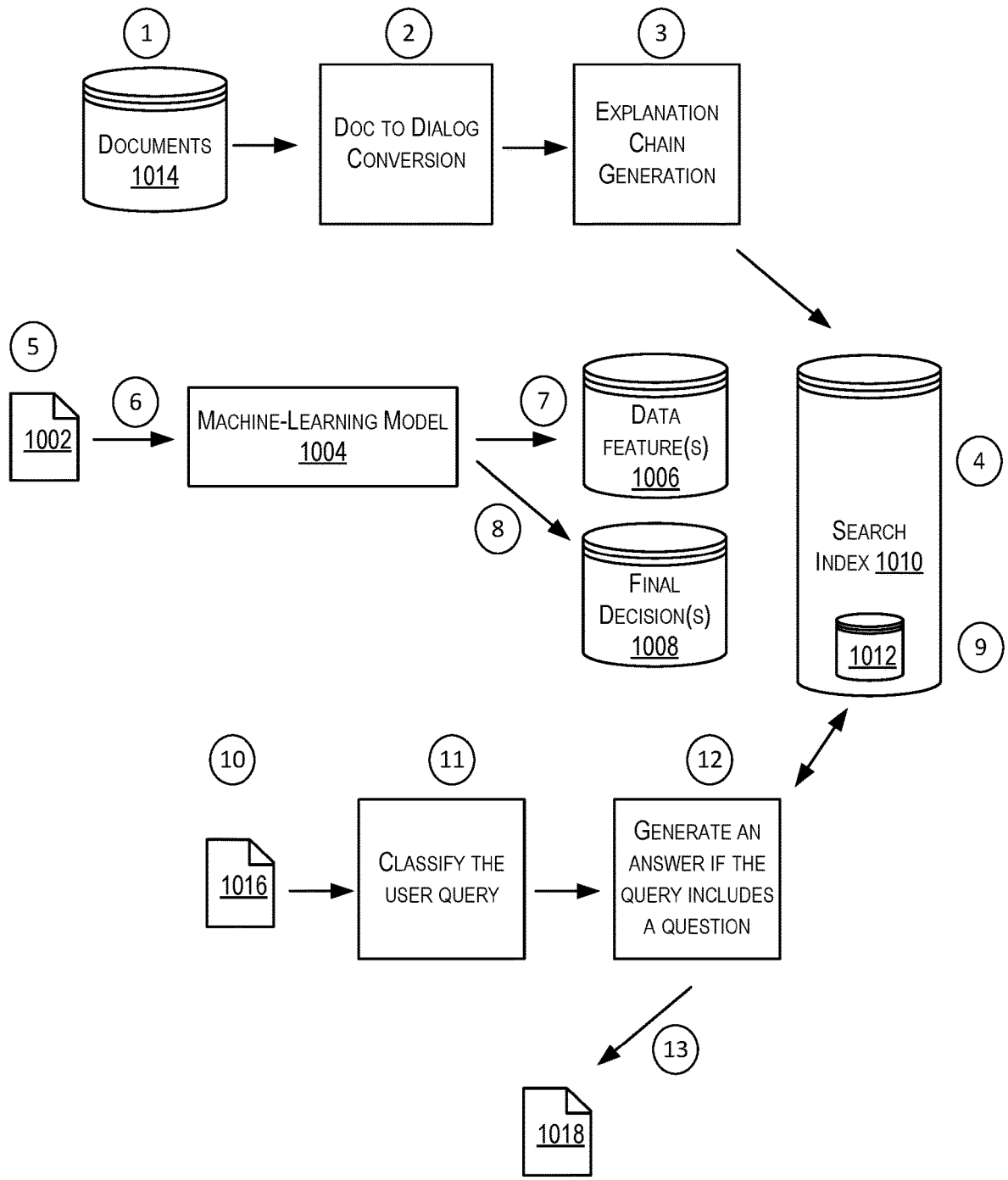
FIG. 10 depicts a flow diagram of an example flow for providing conversational explanations, in accordance with at least one embodiment.

FIG. 10 depicts a flow diagram of an example flow 1000 for providing conversational explanations, in accordance with at least one embodiment.

The flow 1000 begins at step 1, documents 1014 may be obtained (e.g., by the explanation chain manager 124 of FIG. 1). Documents 1014 may be any suitable documents obtained from the Internet, an intranet, or any suitable document database. The documents 1014 may provide a knowledge base from which explanations may be determined.

At step 2, the explanation chain manager 124 may perform document to dialogue conversion. In some embodiments, this may include generating question/answer pairs from the documents 1014. The proposed solution uses discourse trees in conjunction with classification, syntactic generalization, and web-mining to determine questions and answer pairs. One method for performing document to dialog conversion may include the following steps:

1. Construct a discourse tree (or a communicative discourse tree) from a paragraph of text.
2. Identify rhetorical relation nucleus and satellite elementary discourse units within the discourse tree.
3. For each satellite elementary discourse unit:
   a. Convert the candidate into question form
      i. Build a parse tree
      ii. Select parse tree nodes for nouns, verbs and adjectives. Also add nodes linked by co-references (e.g., pronouns).
      iii. For every selected node, form a reduction of a parse tree by removing this node.
      iv. Build a question for this reduction by substitution a Wh word for this node
      v. Select a proper Wh word following the rules: noun→Who or What, verb→'what . . . do', adjective 'Which way', 'How is'.
   b. Identify whether the candidate is in a suitable question form (by using a trained machine learning model)
   c. Generalize the candidate by performing syntactic generalization
   d. Confirm the question as valid by obtaining an answer via a search engine and verifying the answer against the original satellite educational unit
4. If the question is valid, place the question and the corresponding answer in a database.

More information related to performing a document to dialog conversion (e.g., generating question/answer pairs from text) is discussed in further detail in provisional patent application 62/894,162, entitled, "Converting a Document into Chatbot-Accessible form," filed on Aug. 30, 2019, the entire contents of which are incorporated by reference for all purposes.

At step 3, a number of explanation chains may be generated (e.g., by the explanation chain manager 124 of FIG. 1). In some embodiments, the explanation chains may be generated from the documents 1014 as part of an offline process utilizing the techniques discussed above in connection with any suitable combination of the FIGS. 2-5.

At step 4, the documents 1014 may be stored in search index 1010 (e.g., a data store configured to store such information). In some embodiments, the documents 1014 may be indexed with the explanation chains, questions, and answers generated from the documents 1014 at steps 2 and 3.

At step 5, data 1002 may be obtained. Data 1002 may include any suitable input data which may be utilized by the machine-learning model 1004 as input to determine data feature(s) 1006 and/or final decision(s) 1008. The combination of data feature(s) 1006 and final decision(s) 1008 may be referred to herein as a decision log. As a specific example, the flow 1000 may correspond to a process for providing conversational explanations for why a user's loan application was denied. In this context, the data 1002 may include a particular user's banking account information and transactional history, credit score(s) and/or credit report(s), one or more tax documents associated with the particular user, a loan application associated with the user, and/or the like.

At step 6, the data 1002 may be provided to the machine-learning model 1004 as input. In some embodiments, the machine-learning model 1004 may be previously trained (e.g., utilizing any suitable machine-learning technique such as supervised learning, unsupervised learning, reinforced learning, deep learning, neural networks, etc.) using predefined training data (not depicted). Such training data may include example input/output pairs including input data and output data comprising a decision. The specifics of the training data may depend on the context in which machine-learning model 1004 is utilized. As a non-limiting example, machine-learning model 1004 may be a model that has been trained to take as input user data (e.g., various instances of user data including banking account information and transactional history, credit score(s) and/or credit report(s), one or more tax documents, and loan application(s) associated with corresponding users, etc.) to determine whether to approve or deny this particular user a loan (e.g., whether to approve or deny the user's loan application). In this context, the training data for machine-learning model 1004 may include any suitable number of examples of user data, data features identified from the user data, and final decisions corresponding to the user data example.

At step 7, the machine-learning model 1004 may identify a number of data features (e.g., data feature(s) 1006) that were factored in when determining a final decision. By way of example, a data feature(s) 1006 may include data indicating one or more portions of user data (and its corresponding value(s)) that were considered when determining a decision. In the ongoing loan application example, one data feature may include the fact the user's income was $100,000 per year (e.g., as determined from the user's tax documents and/or loan application). Another data feature may be the age of the user's account (e.g., as determined from the user's credit report and/or loan application). Yet another data feature may be the balances of the user's credit card(s) (e.g., as determined from the user's credit report and/or loan application).

At step 8, the machine-learning model 1004 may generate a final decision (e.g., the loan application is approved or denied) for this particular user's loan application based on the lessons and/or featured learned from the training data.

At step 9, the data feature(s) 1006 and the final decision(s) 1008 may be stored in search index 1010 (e.g., in data store 1012 within search index 1010). Steps 5-9 may be performed as an online classification stage.

At step 10, a user query 1016 may be received (e.g., from the user device 106 of FIG. 1). The user query 1016 may include a general question, a specific question, a transactional request, or the like.

At step 11, the user query 1016 may be classified (e.g., by the query type recognizer 606 of FIG. 6, a component of the question answering engine 112 of FIG. 1, operating as part of the autonomous agent application 108 of FIG. 1). The user query 1016 may be classified using any suitable technique discussed above in connection with FIGS. 7-9 (or any suitable combination of said techniques).

At step 12, an answer (e.g., answer 1018) may be generated for the user query 1016 when the user query 1016 includes a question (e.g., a general question, a specific question). By way of example, if the user query 1016 was classified as a "general question," an answer may be identified from the documents 1014 and/or the corresponding explanation chains, questions, and answers generated from the documents 1014 at steps 2 and 3. For example, the dialogue manager 614 may be configured to generate an answer based on a machine-learning model (e.g., machine-learning model 616) that has been previously trained with training data (e.g., documents and corresponding explanation chains, questions, and answers generated from the documents) to identify an answer based on a input question. In some embodiments, the dialogue manager 614 may generate an answer that is modified based at least in part on the data feature(s) 1006 and/or final decision(s) 1008 provided by the machine-learning model 1004 as stored in data store 1012. For example, the dialogue manager 614 may be configured to correlate portions of the explanation chains to particular features of the data feature(s) 1006. Thus, particular terms of the explanation may be replaced by the user's particular feature data values based on these associations.

At step 13, the answer (e.g., answer 1018) generated by the dialogue manager 614 may be provided (e.g., to the user device 106 of FIG. 1, via the user interface 130).

Figure 11:
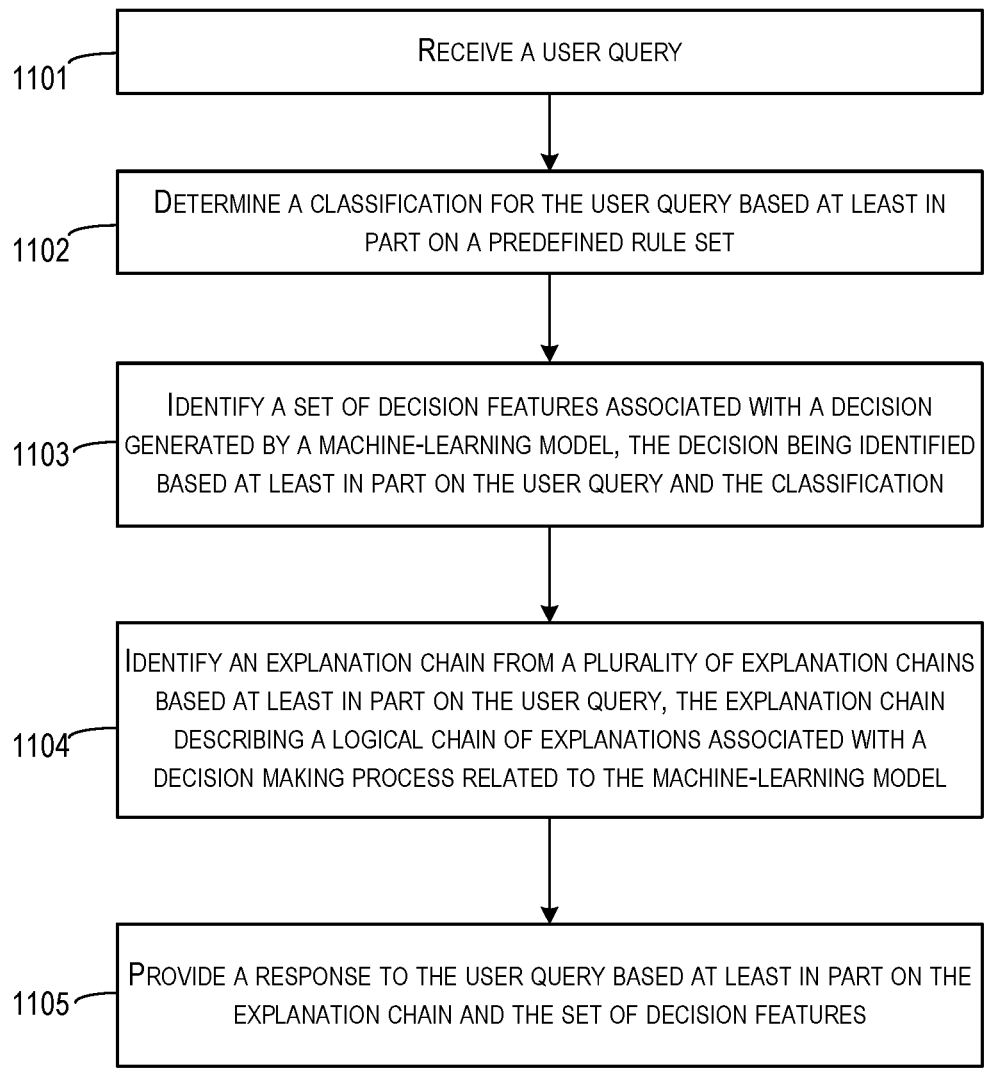
FIG. 11 depicts a flowchart illustrating an example of a method for providing conversational explanations, in accordance with at least one embodiment.

FIG. 11 depicts a flowchart illustrating an example of a method 1100 for providing conversational explanations, in accordance with at least one embodiment.

In some embodiments, the method 1100 may be performed by the autonomous agent application 108 of FIG. 1.

The method 1100 may begin at 1101, where a user query (also referred to herein as an utterance) may be received. By way of example, the user query may be received by the query type recognizer 606 of FIG. 6 (a component of the question answering engine 602 operating as part of the autonomous agent application 108 of FIG. 1) from the user device 106 of FIG. 1.

At block 1102, where a classification for the user query may be determined (e.g., by the rules engine 608 and/or the decision engine 612 of FIG. 6). The classification may be determined based at least in part on a predefined rule set as described in connection with FIGS. 7 and/or 8. Alternatively, as described in FIG. 9, a classification model can be trained to discriminate between questions (general or specific) and transactional requests using the process described in connection with FIG. 9, and the user query (or a parse tree of the user query) may be provided as input to the classification model and output from the model may be received that identifies the user query as a general question, a specific question, a transactional request, or unknown. By default, a user query determined to be "unknown" may be, by default, treated as a general question (or another classification) based on predetermined rules.

At block 1103, a set of decision features associated with a decision generated by a machine-learning model (e.g., the machine-learning model 1004 of FIG. 10, machine-learning model 122 of FIG. 1, etc.) may be identified. In some embodiments, the decision may be identified based at least in part on the user query and the classification. For example, when the user query is identified as a specific question (e.g., why was my loan application rejected?), the autonomous agent application 108 may be configured to retrieve a decision log comprising the decision features utilize by a machine-learning model that generated a decision (e.g., the user's loan application was rejected) corresponding to the user query.

At block 1104, an explanation chain may be identified (e.g., selected by the dialogue manager 614 of FIG. 6) from a plurality of explanation chains based at least in part on the user query. In some embodiments, the explanation chain may describe a logical chain of explanations associated with a decision making process related to the machine-learning model. By way of example, when the user query is "why was my loan application rejected?" the autonomous agent application 108 may be configured to identify an explanation chain relating to reasons for which a loan application may be rejected.

At block 1105, a response may be provided (e.g., by the dialogue manager 614) to the user query based at least in part on the explanation chain and the set of decision features. By way of example, an association between a premise P of the explanation chain may be determined to be associated with a particular decision feature. If the decision feature meets (or in some cases, does not meet) the premise provided by the explanation chain, the decision feature (e.g., including the user data) may be provided in the explanation generated. The explanation may include multiple decision features. An example in which an explanation provided as an answer includes multiple decision features is provided below (see italicized answer).

Question: Why was my mortgage application denied?"
Answer: Some reasons your application was denied is that *your consolidated risk markers score is low and the average age of your accounts is low.*
Question: What can I do about it?
Answer: You should pay down the balances of your credit cards.
Question: What can I do about the average age of my accounts?
Answer: There's not much you can do except wait for your accounts to age.

Figure 12:
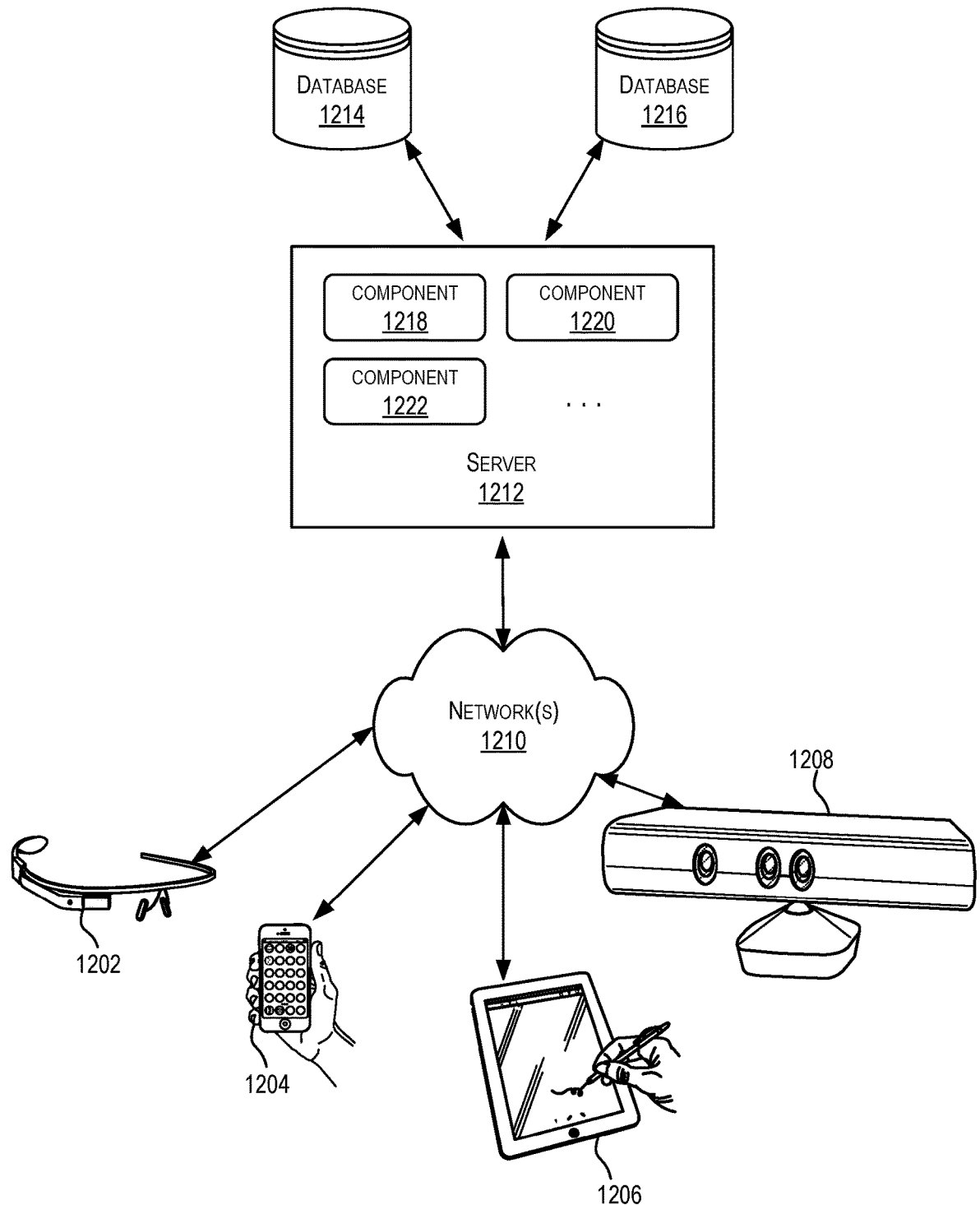
FIG. 12 depicts a simplified diagram of a distributed system for implementing one of the aspects.

FIG. 12 depicts a simplified diagram of a distributed system 1200 for implementing one of the aspects. In the illustrated aspect, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network(s) 1210.

In various aspects, server 1212 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in the figure, the software components 1218, 1220 and 1222 of system 1200 are shown as being implemented on server 1212. In other aspects, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The aspect shown in the figure is thus one example of a distributed system for implementing an aspect system and is not intended to be limiting.

Client computing devices 1202, 1204, 1206, and/or 1208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1202, 1204, 1206, and 1208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1210.

Although exemplary distributed system 1200 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), such as one based on Ethernet, Token-Ring and/or the like. Network(s) 1210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.6 suite of protocols, Bluetooth®, and/or any other wireless protocol); and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1212 can include one or more virtual machines running virtual operating systems, or other computing architectures involving virtualization. One or more flexible pools of logical storage devices can be virtualized to maintain virtual storage devices for the server. Virtual networks can be controlled by server 1212 using software defined networking. In various aspects, server 1212 may be adapted to run one or more services or software applications described in the foregoing disclosure. For example, server 1212 may correspond to a server for performing processing described above in accordance with an aspect of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of aspects, databases 1214 and 1216 may reside in a storage-area network (SAN). Similarly, any necessary files for performing the functions attributed to server 1212 may be stored locally on server 1212 and/or remotely, as appropriate. In one set of aspects, databases 1214 and 1216 may include relational databases, such as databases provided by Oracle, that are adapted to store, update, and retrieve data in response to SQL-formatted commands.

Figure 13:
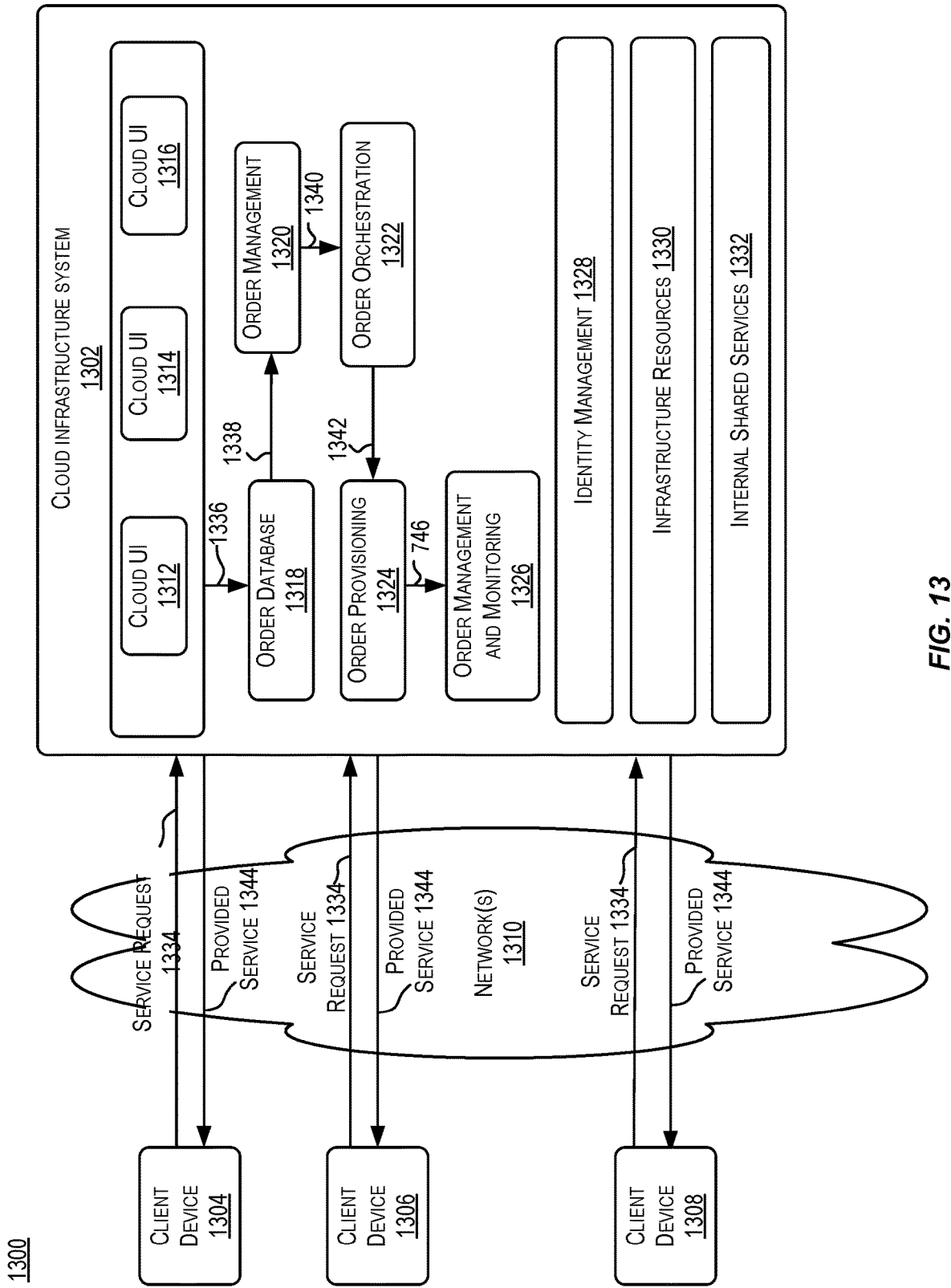
FIG. 13 is a simplified block diagram of components of a system environment by which services provided by the components of an aspect system may be offered as cloud services in accordance with an aspect.

FIG. 13 is a simplified block diagram of one or more components of a system environment 1300 (e.g., a cloud infrastructure system) by which services provided by one or more components of an aspect system may be offered as cloud services, in accordance with an aspect of the present disclosure. In the illustrated aspect, system environment 1300 includes one or more client computing devices 1304, 1306, and 1308 that may be used by users to interact with a cloud infrastructure system 1302 that provides cloud services. The client computing devices may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302.

It should be appreciated that cloud infrastructure system 1302 depicted in the figure may have other components than those depicted. Further, the aspect shown in the figure is only one example of a cloud infrastructure system that may incorporate an aspect of the invention. In some other aspects, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208 of FIG. 12.

Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between client computing devices 1304, 1306, and 1308 and cloud infrastructure system 1302. Each network may be any type of network familiar to those skilled in the art that can support data communications using any of a variety of commercially-available protocols, including those described above for network(s) 1310.

Cloud infrastructure system 1302 may comprise one or more computers and/or servers that may include those described above for server 1212 of FIG. 12.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise in accordance with a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some aspects, the services provided by cloud infrastructure system 1302 may include one or more services provided under a Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some aspects, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1302 may also include infrastructure resources 1330 for providing the resources used to provide various services to customers of the cloud infrastructure system. In one aspect, infrastructure resources 1330 may include pre-integrated and optimized combinations of hardware, such as servers, storage, and networking resources to execute the services provided by the PaaS platform and the SaaS platform.

In some aspects, resources in cloud infrastructure system 1302 may be shared by multiple users and dynamically re-allocated per demand. Additionally, resources may be allocated to users in different time zones. For example, cloud infrastructure system 1302 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1332 may be provided that are shared by different components or modules of cloud infrastructure system 1302 and by the services provided by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1302 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1302, and the like.

In one aspect, as depicted in the figure, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In exemplary operation 1334, a customer using a client device, such as client computing devices 1304, 1306 or 1308, may interact with cloud infrastructure system 1302 by requesting one or more services provided by cloud infrastructure system 1302 and placing an order for a subscription for one or more services offered by cloud infrastructure system 1302. In certain aspects, the customer may access a cloud User Interface (UI), cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 in which the customer intends to subscribe.

After an order has been placed by the customer, the order information is received via the cloud UIs, 1312, 1314 and/or 1316.

At operation 1336, the order is stored in order database 1318. Order database 1318 can be one of several databases operated by cloud infrastructure system 1302 and operated in conjunction with other system elements.

At operation 1338, the order information is forwarded to an order management module 1320. In some instances, order management module 1320 may be configured to perform billing and accounting functions related to the order, such as verifying the order, and upon verification, booking the order.

At operation 1340, information regarding the order is communicated to an order orchestration module 1322. Order orchestration module 1322 may utilize the order information to orchestrate the provisioning of services and resources for the order placed by the customer. In some instances, order orchestration module 1322 may orchestrate the provisioning of resources to support the subscribed services using the services of order provisioning module 1324.

In certain aspects, order orchestration module 1322 enables the management of business processes associated with each order and applies business logic to determine whether an order should proceed to provisioning. At operation 1342, upon receiving an order for a new subscription, order orchestration module 1322 sends a request to order provisioning module 1324 to allocate resources and configure those resources needed to fulfill the subscription order. Order provisioning module 1324 enables the allocation of resources for the services ordered by the customer. Order provisioning module 1324 provides a level of abstraction between the cloud services provided by system environment 1300 and the physical implementation layer that is used to provision the resources for providing the requested services. Order orchestration module 1322 may thus be isolated from implementation details, such as whether or not services and resources are actually provisioned on the fly or pre-provisioned and only allocated/assigned upon request.

At operation 1344, once the services and resources are provisioned, a notification of the provided service may be sent to customers on client computing devices 1304, 1306 and/or 1308 by order provisioning module 1324 of cloud infrastructure system 1302.

At operation 1346, the customer's subscription order may be managed and tracked by an order management and monitoring module 1326. In some instances, order management and monitoring module 1326 may be configured to collect usage statistics for the services in the subscription order, such as the amount of storage used, the amount data transferred, the number of users, and the amount of system up time and system down time.

In certain aspects, system environment 1300 may include an identity management module 1328. Identity management module 1328 may be configured to provide identity services, such as access management and authorization services in system environment 1300. In some aspects, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.). Identity management module 1328 may also include the management of descriptive information about each customer and about how and by whom that descriptive information can be accessed and modified.

Figure 14:
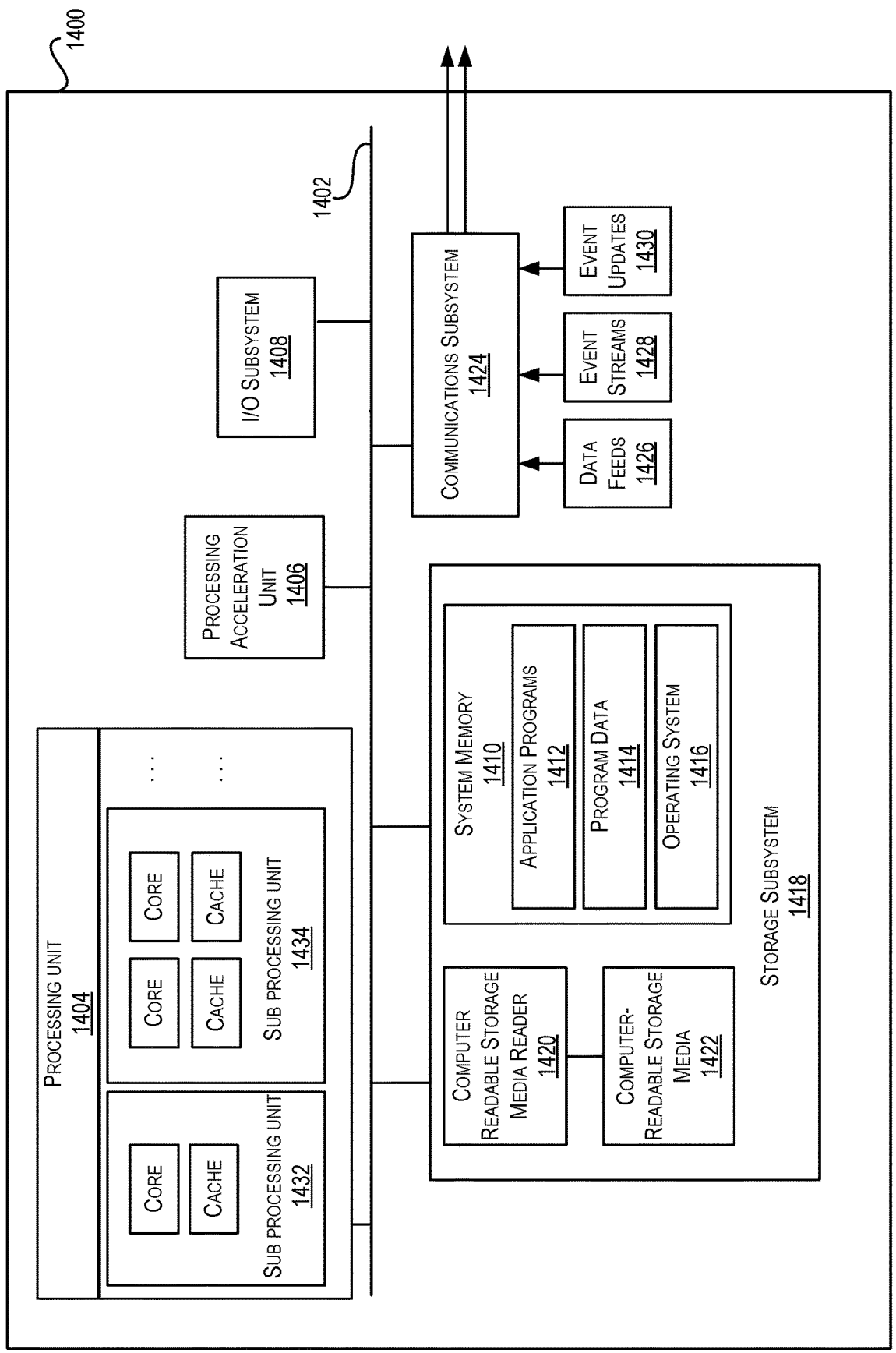
FIG. 14 illustrates an exemplary computer system, in which various aspects may be implemented.

FIG. 14 illustrates an exemplary computer system 1400, in which various aspects may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative aspects of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P886.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain aspects, processing unit 1404 may be implemented as one or more independent processing units 1432 and/or 1434 with single or multicore processors included in each processing unit. In other aspects, processing unit 1404 may also be implemented as a quad-core processing unit formed by integrating two dual-core processors into a single chip.

In various aspects, processing unit 1404 can execute a variety of programs in response to program code and can maintain multiple concurrently executing programs or processes. At any given time, some or all of the program code to be executed can be resident in processing unit 1404 and/or in storage subsystem 1418. Through suitable programming, processing unit 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1418 may also provide a tangible computer-readable storage medium for storing the basic programming and data constructs that provide the functionality of some aspects. Software (programs, code modules, instructions) that when executed by a processor provide the functionality described above, may be stored in storage subsystem 1418. These software modules or instructions may be executed by processing unit 1404. Storage subsystem 1418 may also provide a repository for storing data used in accordance with the present invention.

Storage subsystem 1418 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media such as, but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, non-volatile magnetic media, a magnetic disk drive that reads from or writes to a removable, non-volatile magnetic disk, and an optical disk drive that reads from or writes to a removable, non-volatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some aspects, communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1424 can provide wired network connectivity (e.g., Ethernet) in addition to or instead of a wireless interface.

In some aspects, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive unstructured data feeds 1426 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various attributes and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for providing conversational explanations, comprising:
    obtaining, by one or more processors, a text comprising an explanation associated with a decision-making process related to a machine-learning model;
    identifying, by the one or more processors from an explanation chain comprising an ordered chain of premises generated from the text, that the text comprising the explanation is incomplete based at least in part on determining that a first premise and a second premise of the explanation chain lack a particular type of rhetorical relationship, the ordered chain of premises being generated based on generating a discourse tree by parsing the text in accordance with rhetorical structure theory;
    obtaining, by the one or more processors, additional text based at least in part on executing a query comprising at least a portion of the first premise;
    associating the text with an augmented explanation chain generated from a complete discourse tree, the complete discourse tree being generated based on combining the discourse tree generated from the text and an additional discourse tree generated from the additional text;
    receiving, by the one or more processors, a user query;
    identifying, by the one or more processors, a set of decision features that are associated with a decision generated by the machine-learning model;
    identifying, by the one or more processors, the text is related to the decision-making process associated with the machine-learning model;
    obtaining, by the one or more processors, the augmented explanation chain associated with the text;
    correlating a term of the augmented explanation chain with a decision feature of the set of decision features; and
    providing, by the one or more processors, a response to the user query, the response being generated based at least in part on replacing the term of the augmented explanation chain with the decision feature, wherein the response explains the decision generated by the machine-learning model.

2. The method of claim 1, further comprising:
    managing, by the one or more processors, a decision log associated with the machine-learning model, the machine-learning model being trained to provide a corresponding decision based at least in part on input data, the decision log storing sets of decision features of past decisions provided by the machine-learning model; and
    generating, by the one or more processors, a plurality of explanation chains comprising the explanation chain from a corpus of supporting documents based at least in part on generating discourse trees from the corpus of supporting documents, wherein each discourse tree comprises nodes and edges, the nodes comprising i) nonterminal nodes representing a corresponding rhetorical relationship between two fragments of a document and i) terminal nodes representing the fragments.

3. The method of claim 2, wherein generating the plurality of explanation chains is performed as an offline process.

4. The method of claim 2, wherein generating the plurality of explanation chains further comprises:
    constructing, from the text, the discourse tree based at least in part on segmenting the text into elementary discourse units and identifying rhetorical relationships between respective pairs of elementary discourse units in accordance with rhetorical structure theory;
    generating, from the elementary discourse units of the discourse tree, the ordered chain of premises comprising the first premise of the text and the second premise of the text based at least in part on identifying, from the discourse tree, the particular type of rhetorical relationship exists between a first elementary discourse unit including the first premise and a second elementary discourse unit including the second premise;
    determining, from the ordered chain of premises, that a first entity of the first premise and a second entity of the second premise of the ordered chain of premises lack a logical connection;
    forming the query with an entity of the first entity of the first premise;
    obtaining, based at least in part on executing a search with the query, a candidate search result corresponding to the query, the candidate search result comprising the additional text, wherein generating the additional discourse tree comprises parsing the additional text in accordance with rhetorical structure theory; and responsive to determining that the additional discourse tree includes the rhetorical relationship between the first entity of the first premise and the second entity of the second premise, forming the complete discourse tree based on inserting the additional discourse tree generated from the candidate search result as a sub-tree of the discourse tree generated from the text.

5. The method of claim 4, further comprising indexing the decision log associated with the machine-learning model.

6. The method of claim 1, further comprising determining a classification for the user query, the classification being selected from: i) a factoid question classification, ii) a specific question classification, or iii) a transactional request classification; and determining that the user query relates to the specific question based on determining that the classification for the user query is the specific question classification.

7. The method of claim 1, further comprising:

receiving input data associated with a user;

generating the decision based at least in part by providing the input data to the machine-learning model, wherein classifying the input data causes the machine-learning model to generate the set of decision features associated with the decision; and associating the input data with the set of decision features associated with the decision.

8. The method of claim 1, wherein the explanation chain is generated from a corpus of supporting documents related to the decision-making process the corpus of supporting documents comprising the text.

9. A computing device comprising:

a computer-readable medium storing non-transitory computer-executable program instructions; and a processing device communicatively coupled to the computer-readable medium and configured to execute the non-transitory computer-executable program instructions, wherein executing the non-transitory computer-executable program instructions causes the processing device to perform operations comprising:

obtaining a text comprising an explanation associated with a decision-making process related to a machine-learning model;

identifying, from an explanation chain comprising an ordered chain of premises generated from the text, that the text comprising the explanation is incomplete based at least in part on determining that a first premise and a second premise of the explanation chain lack a particular type of rhetorical relationship, the ordered chain of premises being generated based on generating a discourse tree by parsing the text in accordance with rhetorical structure theory;

obtaining additional text based at least in part on executing a query comprising at least a portion of the first premise;

associating the text with an augmented explanation chain generated from a complete discourse tree, the complete discourse tree being generated based on combining the discourse tree generated from the text and an additional discourse tree generated from the additional text;

receiving a user query;

identifying a set of decision features that are associated with a decision generated by the machine-learning model;

identifying the text as being related to the user query and the decision-making process associated with the machine-learning model;

obtaining the augmented explanation chain associated with the text;

correlating a term of the explanation chain with a decision feature of the set of decision features; and providing a response to the user query, the response being generated based at least in part on replacing the term of the augmented explanation chain with the decision feature, wherein the response explains the decision generated by the machine-learning model.

10. The computing device of claim 9, wherein the processing device performs further operations comprising:

managing a decision log associated with the machine-learning model, the machine-learning model being trained to provide the decision based at least in part on input data, the decision log storing sets of decision features of past decisions provided by the machine-learning model; and generating a plurality of explanation chains comprising the explanation chain from a corpus of supporting documents based at least in part on generating discourse trees from the corpus of supporting documents, wherein each discourse tree comprises nodes and edges, the nodes comprising i) nonterminal nodes representing a corresponding rhetorical relationship between two fragments of a document and i) terminal nodes representing the fragments.

11. The computing device of claim 10, wherein generating the plurality of explanation chains further comprises:

constructing, from the text, the discourse tree based at least in part on segmenting the text into elementary discourse units and identifying rhetorical relationships between respective pairs of elementary discourse units in accordance with rhetorical structure theory;

generating, from the elementary discourse units of the discourse tree, the ordered chain of premises comprising the first premise of the text and the second premise of the text based at least in part on identifying, from the discourse tree, the particular type of rhetorical relationship exists between a first elementary discourse unit including the first premise and a second elementary discourse unit including the second premise;

determining, from the ordered chain of premises, that a first entity of the first premise and a second entity of the second premise of the ordered chain of premises lack a logical connection;

forming the query with an entity of the first entity of the first premise;

obtaining, based at least in part on executing a search with the query, a candidate search result corresponding to the query, the candidate search result comprising the additional text, wherein generating the additional discourse tree comprises parsing the additional text in accordance with rhetorical structure theory; and responsive to determining that the additional discourse tree includes the rhetorical relationship between the first entity of the first premise and the second entity of the second premise, forming the complete discourse tree based on inserting the additional discourse tree generated from the candidate search result as a sub-tree of the discourse tree generated from the text.

12. The computing device of claim 11, wherein the processing device performs further operations comprising indexing the decision log associated with the machine-learning model.

13. The computing device of claim 9, wherein the processing device performs further operations comprising:
receiving input data associated with a user;
generating the decision based at least in part by providing the input data to the machine-learning model, wherein classifying the input data causes the machine-learning model to generate the set of decision features associated with the decision; and
associating the input data with the set of decision features associated with the decision.

14. The computing device of claim 9, wherein the explanation chain is generated from a corpus of supporting documents related to the decision-making process the corpus of supporting documents comprising the text.

15. A non-transitory computer-readable medium storing computer-executable program instructions, wherein when executed by a processing device, causes the processing device to perform operations comprising:
obtaining a text comprising an explanation associated with a decision-making process related to a machine-learning model;
identifying, from an explanation chain comprising an ordered chain of premises generated from the text, that the text comprising the explanation is incomplete based at least in part on determining that a first premise and a second premise of the explanation chain lack a particular type of rhetorical relationship, the ordered chain of premises being generated based on generating a discourse tree by parsing the text in accordance with rhetorical structure theory;
obtaining additional text based at least in part on executing a query comprising at least a portion of the first premise;
associating the text with an augmented explanation chain generated from a complete discourse tree, the complete discourse tree being generated based on combining the discourse tree generated from the text and an additional discourse tree generated from the additional text;
receiving a user query;
identifying a set of decision features that are associated with a decision generated by the machine-learning model;
identifying the text as being related to the user query and the decision-making process associated with the machine-learning model;
obtaining the augmented explanation chain associated with the text;
correlating a term of the explanation chain with a decision feature of the set of decision features; and
providing a response to the user query, the response being generated based at least in part on replacing the term of the augmented explanation chain with the decision feature, wherein the response explains the decision generated by the machine-learning model.

16. The non-transitory computer-readable medium of claim 15, wherein the processing device performs further operations comprising:
managing a decision log associated with the machine-learning model, the machine-learning model being trained to provide the decision based at least in part on input data, the decision log storing sets of decision features of the decisions provided by the machine-learning model; and
generating a plurality of explanation chains comprising the explanation chain from a corpus of supporting documents based at least in part on generating discourse trees from the corpus of supporting documents, wherein each discourse tree comprises nodes and edges, the nodes comprising i) nonterminal nodes representing a corresponding rhetorical relationship between two fragments of a document and i) terminal nodes representing the fragments.

17. The non-transitory computer-readable medium of claim 16, wherein generating the plurality of explanation chains further comprises:
constructing, from the text, the discourse tree based at least in part on segmenting the text into elementary discourse units and identifying rhetorical relationships between respective pairs of elementary discourse units in accordance with rhetorical structure theory;
generating, from the elementary discourse units of the discourse tree, the ordered chain of premises comprising the first premise of the text and the second premise of the text based at least in part on identifying, from the discourse tree, the particular type of rhetorical relationship exists between a first elementary discourse unit including the first premise and a second elementary discourse unit including the second premise;
determining, from the ordered chain of premises, that a first entity of the first premise and a second entity of the second premise of the ordered chain of premises lack a logical connection;
forming the query with an entity of the first entity of the first premise;
obtaining, based at least in part on executing a search with the query, a candidate search result corresponding to the query, the candidate search result comprising the additional text, wherein generating the additional discourse tree comprises parsing the additional text in accordance with rhetorical structure theory; and
responsive to determining that the additional discourse tree includes the rhetorical relationship between the first entity of the first premise and the second entity of the second premise, forming the complete discourse tree based on inserting the additional discourse tree generated from the candidate search result as a sub-tree of the discourse tree generated from the text.

18. The non-transitory computer-readable medium of claim 17, wherein the processing device performs further operations comprising indexing the decision log associated with the machine-learning model.

19. The non-transitory computer-readable medium of claim 15, wherein the processing device performs further operations comprising:
receiving input data associated with a user;
generating the decision based at least in part by providing the input data to the machine-learning model, wherein classifying the input data causes the machine-learning model to generate the set of decision features associated with the decision; and
associating the input data with the set of decision features associated with the decision.

20. The non-transitory computer-readable medium of claim 15, wherein the explanation chain is generated from a corpus of supporting documents related to the decision-making process the corpus of supporting documents comprising the text.

* * * * *

UNITED STATES PATENT AND TRADEMARK OFFICE
CERTIFICATE OF CORRECTION

| | |
|---|---|
| PATENT NO. | : 11,847,420 B2 |
| APPLICATION NO. | : 16/930226 |
| DATED | : December 19, 2023 |
| INVENTOR(S) | : Galitsky |

It is certified that error appears in the above-identified patent and that said Letters Patent is hereby corrected as shown below:

In the Drawings

On sheet 2 of 14, in FIG. 2, under Reference Numeral 204, Line 1, delete "ELBORATION" and insert -- ELABORATION --, therefor.

On sheet 3 of 14, in FIG. 3, Line 8, delete "Likelihoo" and insert -- Likelihood --, therefor.

On sheet 3 of 14, in FIG. 3, Line 12, delete "Occastion" and insert -- Occasion --, therefor.

In the Specification

In Column 3, Line 58, delete "a the" and insert -- the --, therefor.

In Column 9, Line 57, delete "$P_i$," and insert -- $P_1$, --, therefor.

In Column 9, Line 65, delete "$T_2$." and insert -- $T_2$: --, therefor.

In the Claims

In Column 36, Line 40, in Claim 10, delete "and i)" and insert -- and ii) --, therefor.

In Column 38, Line 29, in Claim 10, delete "and i)" and insert -- and ii) --, therefor.

In Column 40, Line 9, in Claim 16, delete "and i)" and insert -- and ii) --, therefor.

Signed and Sealed this
Fourteenth Day of May, 2024

Katherine Kelly Vidal
*Director of the United States Patent and Trademark Office*